United States Patent
Cao et al.

(10) Patent No.: US 11,734,888 B2
(45) Date of Patent: Aug. 22, 2023

(54) REAL-TIME 3D FACIAL ANIMATION FROM BINOCULAR VIDEO

(71) Applicant: Meta Platforms Technologies, LLC, Menlo Park, CA (US)

(72) Inventors: Chen Cao, Pittsburgh, PA (US); Vasu Agrawal, Pittsburgh, PA (US); Fernando De la Torre, Pittsburgh, PA (US); Lele Chen, Rochester, NY (US); Jason Saragih, Pittsburgh, PA (US); Tomas Simon Kreuz, Pittsburgh, PA (US); Yaser Sheikh, Pittsburgh, PA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/396,534

(22) Filed: Aug. 6, 2021

(65) Prior Publication Data
US 2022/0358719 A1 Nov. 10, 2022

Related U.S. Application Data

(60) Provisional application No. 63/179,087, filed on Apr. 23, 2021.

(51) Int. Cl.
*G06T 17/20* (2006.01)
*G06T 7/586* (2017.01)
(Continued)

(52) U.S. Cl.
CPC ............ *G06T 17/20* (2013.01); *G06N 3/045* (2023.01); *G06T 7/586* (2017.01); *G06T 7/73* (2017.01);
(Continued)

(58) Field of Classification Search
CPC ............ G06T 17/20; G06T 7/586; G06T 7/73; G06T 13/40; G06T 15/04; G06V 40/165; G06V 40/176; G06N 3/0454
See application file for complete search history.

(56) References Cited

U.S. PATENT DOCUMENTS

| | | | |
|---|---|---|---|
| 2013/0322770 A1* | 12/2013 | Kaneda ................ | G06V 10/454 382/201 |
| 2017/0256033 A1* | 9/2017 | Tuzel .................... | G06T 3/4053 |

(Continued)

OTHER PUBLICATIONS

Agarwal S., et al., "Ceres Solver: Tutorial & Reference," 2010, 1 Page, Retrieved from the internet: URL: http://ceres-solver.org/ [retrieved on Mar. 2, 2021].

(Continued)

*Primary Examiner* — Abderrahim Merouan
(74) *Attorney, Agent, or Firm* — McDermott Will & Emery LLP

(57) ABSTRACT

A method for providing real-time three-dimensional facial animation from video is provided. The method includes collecting images of a subject, and forming a three-dimensional mesh for the subject based on a facial expression factor and a head pose of the subject extracted from the images of the subject. The method also includes forming a texture transformation based on an illumination parameter associated with an illumination configuration for the images from the subject, forming a three-dimensional model for the subject based on the three-dimensional mesh and the texture transformation, determining a loss factor based on selected points in a test image from the subject and a rendition of the test image by the three-dimensional model, and updating the three-dimensional model according to the loss factor. A system and a non-transitory, computer-readable medium storing instructions to perform the above method are also provided.

17 Claims, 14 Drawing Sheets

(51) Int. Cl.
G06T 7/73 (2017.01)
G06V 40/16 (2022.01)
G06T 13/40 (2011.01)
G06T 15/04 (2011.01)
G06N 3/045 (2023.01)

(52) U.S. Cl.
CPC ............. *G06T 13/40* (2013.01); *G06T 15/04* (2013.01); *G06V 40/165* (2022.01); *G06V 40/176* (2022.01)

(56) References Cited

U.S. PATENT DOCUMENTS

| | | | | |
|---|---|---|---|---|
| 2017/0323167 | A1* | 11/2017 | Mapen | G06V 40/19 |
| 2020/0013212 | A1* | 1/2020 | Wang | G06V 40/171 |
| 2022/0003671 | A1* | 1/2022 | Ghosh | G01N 21/55 |

OTHER PUBLICATIONS

Bagautdinov T., et al., "Modeling Facial Geometry Using Compositional VAEs," Computer Vision and Pattern Recognition (CVPR), 2018, pp. 3877-3886.
Baltrusaitis T., et al., "3D Constrained Local Model for Rigid and Non-Rigid Facial Tracking," Computer Vision and Pattern Recognition (CVPR), 2012, pp. 2610-2617.
Blanz V., et al., "A Morphable Model for the Synthesis of 3D Faces," Computer Graphics and Interactive Techniques, 1999, pp. 187-194.
Blanz V., et al., "Reanimating Faces in Images and Video," Computer Forum Graphics (CFG), Sep. 2003, vol. 22, No. 3, pp. 641-650.
Booth J., et al., "Large Scale 3D Morphable Models," Computer Vision, 2018, vol. 126, No. 1-4, pp. 233-254.
Bouaziz S., et al., "Online Modeling for Realtime Facial Animation," ACM Transactions on Graphics (TOG), Jul. 2013, vol. 32, No. 4, pp. 1-10.
Cao C., et al., "3D Shape Regression for Real-Time Facial Animation," ACM Transactions on Graphics (TOG), Jul. 2013, vol. 32, No. 4, pp. 1-10.
Cao C., et al., "Displaced Dynamic Expression Regression for Real-Time Facial Tracking and Animation," ACM Transactions on Graphics (TOG), Jul. 2014, vol. 33, No. 4, pp. 1-10.
Cao C., et al., "FaceWarehouse: A 3D Facial Expression Database for Visual Computing," IEEE Transactions on Visualization and Computer Graphics, 2013, vol. 20, No. 3, pp. 413-425.
Cao C., et al., "Real-Time High-Fidelity Facial Performance Capture," ACM Transactions on Graphics (TOG), 2015, vol. 34, No. 4, pp. 1-9.
Cao C., et al., "Stabilized Real-Time Face Tracking Via a Learned Dynamic Rigidity Prior," ACM Transactions on Graphics (TOG), Dec. 2018, vol. 37, No. 6, pp. 1-11.
Casas D., et al., "Rapid Photorealistic Blendshapes from Commodity RGB-D Sensors," Proceedings of the 19th Symposium on Interactive 3D Graphics and Games, 2015, pp. 134.
Chai J-X., et al., "Vision-Based Control of 3D Facial Animation," Eurographics/SIGGRAPH Symposium on Computer Animation, 2003, pp. 193-206.
Chen Y. L., et al., "Accurate and Robust 3D Facial Capture Using a Single RGBD Camera," Computer Vision Foundation (CVF), 2013, pp. 3615-3622.
Cootes T. F., et al., "Active Appearance Models," IEEE Transactions on Pattern Analysis and Machine Intelligence, 2001, vol. 23, No. 6, pp. 681-685.
Decarlo D., el al., "Optical Flow Constraints on Deformable Models with Applications to Face Tracking," International Journal of Computer Vision, 2000, vol. 38, No. 2, pp. 99-127.
Dou M., et al., "Fusion4D: Real-Time Performance Capture of Challenging Scenes," ACM Transactions on Graphics (TOG), 2016, vol. 35, No. 4, pp. 1-13.
Dou M., et al., "Motion2Fusion: Real-Time Volumetric Performance Capture," ACM Transactions on Graphics (TOG), 2017, vol. 36, No. 6, pp. 1-16.
Fyffe G., et al., "Driving High-Resolution Facial Scans with Video Performance Capture," ACM Transactions on Graphics (TOG), Dec. 2014, vol. 34, No. 1, pp. 1-14.
Gerig T., et al., "Morphable Face Models—An Open Framework," International Conference on Automatic Face and Gesture Recognition (FG), 2018, pp. 75-82.
Huber P., et al., "A Multiresolution 3D Morphable Face Model and Fitting Framework," Computer Vision, Imaging and Computer Graphics Theory and Applications, 2016, pp. 79-86.
Kahraman F., et al., "An Active Illumination and Appearance (AIA) Model for Face Alignment," Computer Vision and Pattern Recognition (CVPR), 2007, pp. 1-7.
Kazemi V., et al., "One Millisecond Face Alignment with an Ensemble of Regression Trees," Computer Vision and Pattern Recognition (CVPR), 2014, pp. 1867-1874.
Kim H., et al., "Deep Video Portraits," ACM Transactions on Graphics, Aug. 2018, vol. 37 (4), Article 163, pp. 1-14.
Kim H., et al., "InverseFaceNet: Deep Single-Shot Inverse Face Rendering From A Single Image," arXiv:1703.10956, 2017, 10 Pages.
Kim H., et al., "Neural Style-Preserving Visual Dubbing," ACM Transactions on Graphics (TOG), 2019, vol. 38, No. 6, pp. 1-13.
Kingma D.P., et al., "Auto-Encoding Variational Bayes," May 1, 2014, arXiv:1312.6114v10, pp. 1-14.
Klehm O., et al., "Recent Advances in Facial Appearance Capture," Computer Graphics Forum (CGF), 2015, vol. 34, No. 2, pp. 709-733.
Laine S., et al., "Production-level Facial Performance Capture Using Deep Convolutional Neural Networks," Proceedings of the ACM SIGGRAPH / Eurographics Symposium on Computer Animation, 2017, Article. 10, pp. 1-10.
Lewis J. P., et al., "Practice and Theory of Blendshape Facial Models," Eurographics, 2014, pp. 1-23.
Li H., et al., "Realtime Facial Animation with On-the-Fly Correctives," ACM Transactions on Graphics (TOG), 2013, vol. 32, No. 4, 10 Pages.
Li T., et al., "Learning a Model of Facial Shape and Expression from 4D Scans," ACM Transactions on Graphics (TOG), 2017, vol. 36, No. 6, 17 Pages.
Li Z., et al., "Learning to Reconstruct Shape and Spatially-Varying Reflectance from a Single Image," ACM Transactions on Graphics (TOG), 2018, vol. 37, No. 6, pp. 1-11.
Lombardi S., et al., "Deep Appearance Models for Face Rendering," ACM Transactions on Graphics, Aug. 2018, vol. 37 (4), Article 68, pp. 1-13.
Martin-Brualla R., et al., "LookinGood: Enhancing Performance Capture with Real-time Neural Re-rendering," ACM Transactions on Graphics, Nov. 12, 2018, vol. 37 (6), Article 225, pp. 1-14.
Matthews I., et al., "Active Appearance Models Revisited," International Journal of Computer Vision, 2004, vol. 60, No. 2, pp. 135-164.
McDonagh S., et al., "Synthetic Prior Design for Real-Time Face Tracking," In International Conference on 3D Vision (3DV), 2016, pp. 639-648.
Nagano K., et al., "Pagan: Real-time Avatars Using Dynamic Textures," ACM Transactions on Graphics (TOG), vol. 37, No. 6, Nov. 2018, 12 pages.
Olszewski K., et al., "High-Fidelity Facial and Speech Animation for VR HMDs," ACM Transactions on Graphics (TOG), 2016, vol. 35, No. 6, pp. 1-14.
Orts-Escolano S., et al., "Holoportation: Virtual 3D Teleportation in Real-time," In Proceedings of the 29th Annual Symposium on User Interface Software and Technology, 2016, pp. 741-754.
Pandey R., et al., "Volumetric Capture of Humans with A Single RGBD Camera Via Semi-Parametric Learning," In Proceedings of the IEEE Conference on Computer Vision and Pattern Recognition, Jun. 2019, pp. 9709-9718.
Saragih J. M., et al., "Real-Time Avatar Animation from a Single Image," IEEE International Conference on Automatic Face & Gesture Recognition (FG), 2011, pp. 213-220.

(56) References Cited

OTHER PUBLICATIONS

Schwartz G., et al., "The Eyes Have It: An Integrated Eye and Face Model for Photorealistic Facial Animation," ACM Transactions on Graphics (TOG), Jul. 2020, vol. 39, No. 4, 15 Pages.
Sengupta S., et al., "SfSNet: Learning Shape, Reflectance and Illuminance of Faces in the Wild," Conference on Computer Vision and Pattern Recognition (CVPR), 2018, pp. 6296-6305.
Simonyan K., et al., "Very Deep Convolutional Networks for Large-Scale Image Recognition," arXiv prerprint, arXiv: 1409.1556, Sep. 4, 2014, 14 pages.
Tena J.R., et al., "Interactive Region-Based Linear 3D Face Models," ACM SIGGRAPH 2011 papers, 2011, vol. 30, No. 4, Article. 76, 10 Pages, https://doi.org/10.1145/1964921.1964971.
Tewari A., et al., "MoFa: Model-based Deep Convolutional Face Autoencoder for Unsupervised Monocular Reconstruction," 2017 IEEE International Conference on Computer Vision (ICCV), Oct. 29, 2017, pp. 1274-1283.
Thies J., et al., "Face2Face: Real-Time Face Capture and Reenactment of RGB Videos," Conference on Computer Vision and Pattern Recognition (CVPR), 2016, pp. 2387-2395.
Thies J., et al., "HeadOn: Real-Time Reenactment OF Human Portrait Videos," ACM Transactions on Graphics (TOG), 2018, vol. 37, No. 4, pp. 1-13.
Bai Z., et al., "Deep Facial Non-Rigid Multi-View Stereo," IEEE/CVF Conference on Computer Vision and Pattern Recognition (CVPR), IEEE, Jun. 13, 2020, pp. 5849-5859.
Dou P., et al., "Multi-View 3D Face Reconstruction with Deep Recurrent Neural Networks," IEEE International Joint Conference on Biometrics (IJCB), IEEE, Oct. 1, 2017, pp. 483-492.
Genova K., et al., "Unsupervised Training for 3D Morphable Model Regression," In Proceedings of the IEEE Conference on Computer Vision and Pattern Recognition (CVPR), 2018, pp. 8377-8386.
EPO—International Search Report and Written Opinion for International Application No. PCT/US2022/026074, dated Oct. 17, 2022, 12 pages.
Song G., et al., "Recovering Facial Reflectance and Geometry from Multi-View Images," Image and Vision Computing, Feb. 27, 2020, vol. 96, 11 pages.
Wu F., et al., "MVF-Net: Multi-View 3D Face Morphable Model Regression," Arxiv.org, Apr. 9, 2019, 10 pages.
Thies J., et al., "Real-time Expression Transfer for Facial Reenactment," ACM Transactions on Graphics (TOG), 2015, vol. 34, No. 6, 14 Pages.
Tran A. T., et al., "Regressing Robust and Discriminative 3D Morphable Models With a Very Deep Neural Network," Computer Vision and Pattern Recognition (CVPR), 2017, pp. 5163-5172.
Tran L., et al., "Nonlinear 3D Face Morphable Model," Computer Vision and Pattern Recognition (CVPR), 2018, pp. 7346-7355.
Tran L., et al., "Towards High-Fidelity Nonlinear 3D Face Morphable Model," Computer Vision and Pattern Recognition (CVPR), 2019, pp. 1126-1135.
Tzimiropoulos G., et al., "Generic Active Appearance Models Revisited," Computer Vision—Asian Conference on Computer Vision (ACCV), 2012, pp. 650-663.
Valgaerts L., et al., "Lightweight Binocular Facial Performance Capture under Uncontrolled Lighting," ACM Transactions on Graphics (TOG), 2012, vol. 31, pp. 187:1-187:11.
Vlasic D., et al., "Face Transfer with Multilinear Models," ACM Transactions on Graphics (TOG), 2005, vol. 24, No. 3, pp. 426-433.
Wei S. E., et al., "VR Facial Animation via Multiview Image Translation," ACM Transactions on Graphics (TOG), 2019, vol. 38, No. 4, pp. 1-16.
Weise T., et al., "Realtime Performance-Based Facial Animation," ACM Transactions on Graphics (TOG), 2011, vol. 30, No. 4, pp. 1-10.
Xiao J., et al., "Real-Time Combined 2D+3D Active Appearance Models," Computer Vision and Pattern Recognition (CVPR), 2004, vol. 2, pp. 535-542.
Xiong X., et al., "Supervised Descent Method and Its Applications to Face Alignment," Computer Vision and Pattern Recognition (CVPR), 2013, pp. 532-539.
Yoon J. S., et al., "Self-Supervised Adaptation of High-Fidelity Face Models for Monocular Performance Tracking," Computer Vision and Pattern Recognition (CVPR), 2019, pp. 4601-4609.
Yuille A., et al., "Vision as Bayesian Inference: Analysis by Synthesis?," Trends in Cognitive Sciences, 2006, vol. 10, No. 7, pp. 301-308.
Zakharov E., et al., "Few-Shot Adversarial Learning of Realistic Neural Talking Head Models," In Proceedings of the 2019 IEEE/CVF International Conference on Computer Vision, 2019, 10 pages.
Zhang R., "Making Convolutional Networks Shift-Invariant Again," arXiv preprint arXiv:1904.11486, 2019, 17 Pages.
Zollhofer M., et al., "State of the Art on Monocular 3D Face Reconstruction, Tracking, and Applications," Computer Graphics Forum (CGF), 2018, vol. 37, No. 2, pp. 523-550.

\* cited by examiner

REAL-TIME 3D FACIAL ANIMATION FROM BINOCULAR VIDEO

CROSS REFERENCE TO RELATED APPLICATIONS

The present disclosure is related and claims priority under 35 U.S.C. § 119(e) to U.S. Prov. Pat. Appln. No. 63/179,087, entitled REAL-TIME 3D NEURAL FACIAL ANIMATION FROM BINOCULAR VIDEO, to Chen Cao, et al. filed on Apr. 23, 2021, the contents of which are hereby incorporated by reference in their entirety, for all purposes.

BACKGROUND

Field

The present disclosure generally relates to the field of computer graphics and animation. More specifically, the present disclosure relates to models to generate real-time, high fidelity three-dimensional avatars under multiple environmental conditions for virtual reality (VR) and augmented reality (AR) applications.

Description of the Related Art

Current techniques for three-dimensional simulation of a human head are too sophisticated for real-time implementation, or are too coarse for a convincing real-time embedding in a virtual environment. Furthermore, highly trained, sophisticated models tend to overshoot and create over educated models that may become highly inaccurate when environmental conditions are changed. This tends to be the case over different illumination conditions encountered during a simulation event (e.g., a user that transitions from a bright outdoors scene into a darker indoor environment).

SUMMARY

In one embodiment of the present disclosure, a computer-implemented method is described for training a face animation model to create real-time facial animation from binocular video is disclosed. The computer-implemented method includes collecting multiple images of a subject, the images from the subject comprising one or more simultaneous views from different profiles of the subject, and forming a three-dimensional mesh for the subject based on a facial expression factor and a head pose of the subject extracted from the images of the subject. The computer-implemented method also includes forming a texture transformation based on an illumination parameter associated with an illumination configuration for the images from the subject, forming a three-dimensional model for the subject based on the three-dimensional mesh and the texture transformation, determining a loss factor based on selected points in a test image from the subject and a rendition of the test image by the three-dimensional model, and updating the three-dimensional model according to the loss factor.

According to one embodiment, a system is described that includes one or more processors and a memory coupled to the one or more processors, the memory including instructions that, when executed by the one or more processors, cause the one or more processors to collect multiple images of a subject, the images from the subject comprising one or more simultaneous views from different profiles of the subject, to form a three-dimensional mesh for the subject based on a facial expression factor and a head pose of the subject extracted from the images of the subject, to form a texture transformation based on an illumination parameter associated with an illumination configuration for the images from the subject, to form a three-dimensional model for the subject based on the three-dimensional mesh and the texture transformation, to determine a loss factor based on selected points in a test image from the subject and a rendition of the test image by the three-dimensional model, and to update the three-dimensional model according to the loss factor.

According to one embodiment, a non-transitory, machine-readable medium is described that includes instructions, which when executed by one or more processors, cause a computer to perform a method, including collecting multiple images of a subject, the images from the subject comprising one or more simultaneous views from different profiles of the subject, forming a three-dimensional mesh for the subject based on a facial expression factor and a head pose of the subject extracted from the images of the subject, and forming a texture transformation based on an illumination parameter associated with an illumination configuration for the images from the subject. The method also includes forming a three-dimensional model for the subject based on the three-dimensional mesh and the texture transformation, determining a loss factor based on selected points in a test image from the subject and a rendition of the test image by the three-dimensional model, and updating the three-dimensional model according to the loss factor.

In yet another embodiment, a system is described that includes a means for storing commands and a means for executing the commands causing the system to perform a method that includes collecting a binocular image from a subject, determining a facial expression factor and a head pose factor of the subject from the binocular image from the subject, and determining an illumination parameter from an illumination condition for a scene in the binocular image from the subject. The method also includes determining a texture and a color to a face of the subject based on the illumination parameter, generating a three-dimensional representation of the subject based on the facial expression factor, the head pose factor, and the texture and color of the face of the subject, and embedding the three-dimensional representation of the subject in a virtual reality environment, in real-time.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
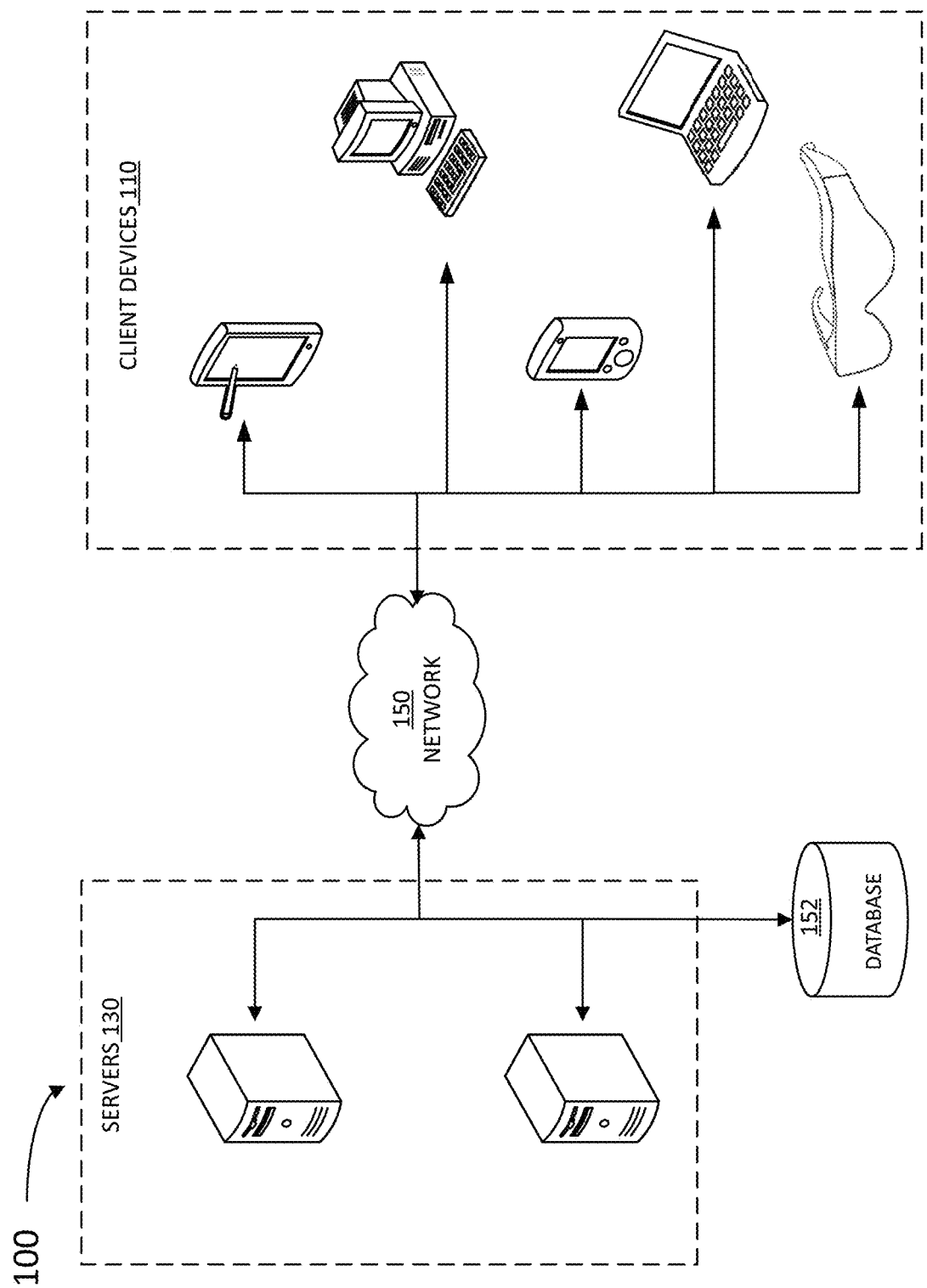
FIG. 1 illustrates an example architecture suitable for providing a real-time, 3D facial animation of a human head from binocular video, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

A real-time system for high-fidelity facial animation from binocular video is provided. The system can track subtle expressions in uncontrolled environments (e.g., varying lighting conditions). The system includes a neural network model to compensate from the domain mismatch between the face model and in-the-wild image under varying illumination conditions. In some embodiments, better visual minima in the model training are found with a coarse-to-fine strategy. A more efficient few-shot learning method enables fine-tuning the pre-trained regression to new environment in an unsupervised manner.

Marker-less facial motion capture has been a long standing problem in computer graphics and computer vision. The human visual system has a remarkable ability to recognize human expressions. Driving avatars from video with a high-degree of photorealism and being able to transfer subtle expressions (e.g., perfect eye contact, lip-chewing, tongue movement, blinking) is desirable in many applications, such as animating characters in movies or systems to promote a sense of social presence in AR/VR. In these scenarios, a challenge of facial expression transfer algorithms is to be able to accurately track facial expressions in real-time and under varying lighting conditions.

It is also desirable to correctly decouple rigid (e.g., 3D head pose) and non-rigid motion (e.g., facial expression) and to render the user's appearance in the avatar. In some embodiments, a precise facial tracking/alignment mechanism that achieves sub-pixel accuracy decouples the rigid/non-rigid motion of the face. Precise and dense facial feature tracking is challenging in natural scenarios due to sensor noise and variability in lighting. Lighting changes tend to dominate and obscure marginal information such as detailed facial features. Traditional attempts to decouple the illumination from the image usually destroy information useful for determining subtle facial motion.

To render user's appearance in the avatar, traditional approaches used a variety of face tracking methods including shape models for facial animation. However, these methods fail to recover important facial details such as interior of the mouth, or blinking of the eyes. Alternatively, parametric face models such as Active Appearance Models, Morphable Models, or Deep Appearance Models jointly model the two-dimensional (2D) and three-dimensional (3D) shape and appearance allowing a more precise registration/alignment between the image and the model. In addition, these methods perform tracking by reconstruction with the additional benefit of having a latent code for reconstructing the appearance, providing an elegant solution to rendering the appearance of the subject. Parameterized face models can be learned across users leading to generic models, or within a subject creating a person-specific (PS) model. Generic models typically achieve robustness to lighting or user variability. However, generic models do not provide accurate reconstruction for new subjects, resulting in unacceptable loss of facial expression detail. On the other hand, PS models are able to achieve a desired accuracy in tracking and reconstruction (e.g., finding use in the movie industry). However, PS models are typically run offline and they do not perform well in untrained situations (e.g., different lighting).

Embodiments as disclosed herein resolve the above problems arising in the technical field of computer animation by providing a lightweight process for training a personalized face model to new environments that enables accurate real-time face tracking. Some embodiments include a robust and efficient recovery of rigid and non-rigid motion from sequences with challenging illumination conditions, using binocular video. To achieve this, some embodiments include a person-specific deep appearance model (PS-DAM), which is learned in a multi-camera capture stage (offline) with fixed illumination. Embodiments as disclosed herein generate high fidelity face renderings in real-time, accurately estimating its parameters in unconstrained settings by incorporating, estimating, and predicting differences in illumination conditions and facial changes (e.g., facial hair, makeup, glasses). Finally, the entire system, including inference and rendering, works in real-time to support interactive applications such as telepresence.

Embodiments as disclosed herein include learning (e.g., 'offline' estimation) and fine-tuning steps. Offline face estimation records several videos of a user and registers their face using analysis-by-synthesis. In order to compensate for illumination changes and other factors, some embodiments include a parameterized illumination model and employ a "coarse-to-fine" fitting strategy to simultaneously estimate its parameters along with those of the face model. This strategy effectively avoids converging to poor local minima. The resulting pairs of images and parameters are used in a real-time direct regression model. Some embodiments apply the real-time direct regression model to estimate a 3D shape and texture for a new environment (e.g., different illumination conditions). To compensate for differences between the new environment and those used in training, some embodiments fine-tune the regression model with a few unsupervised images. This approach enables the driving of hyper-realistic 3D face models in unconstrained scenarios.

Example System Architecture

FIG. 1 illustrates an example architecture 100 suitable for accessing a model training engine, according to some embodiments. Architecture 100 includes servers 130 communicatively coupled with client devices 110 and at least one database 152 over a network 150. One of the many servers 130 is configured to host a memory including instructions which, when executed by a processor, cause the server 130 to perform at least some of the steps in methods as disclosed herein. In some embodiments, the processor is configured to control a graphical user interface (GUI) for the user of one of client devices 110 accessing the model training engine. The model training engine may be configured to train a machine learning model for solving a specific application. Accordingly, the processor may include a dashboard tool, configured to display components and graphic results to the user via the GUI. For purposes of load balancing, multiple servers 130 can host memories including instructions to one or more processors, and multiple servers 130 can host a history log and databases including multiple training archives used for the model training engine. Moreover, in some embodiments, multiple users of client devices 110 may access the same model training engine to run one or more machine learning models. In some embodiments, a single user with a single client device 110 may train multiple machine learning models running in parallel in one or more servers 130. Accordingly, client devices 110 may communicate with each other via network 150 and through access to one or more servers 130 and resources located therein.

Servers 130 may include any device having an appropriate processor, memory, and communications capability for hosting the model training engine including multiple tools associated with it. The model training engine may be accessible by various clients 110 over network 150. Clients 110 can be, for example, desktop computers, mobile computers, tablet computers (e.g., including e-book readers), mobile devices (e.g., a smartphone or PDA), or any other device having appropriate processor, memory, and communications capabilities for accessing the model training engine on one or more of servers 130. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like.

Figure 2:
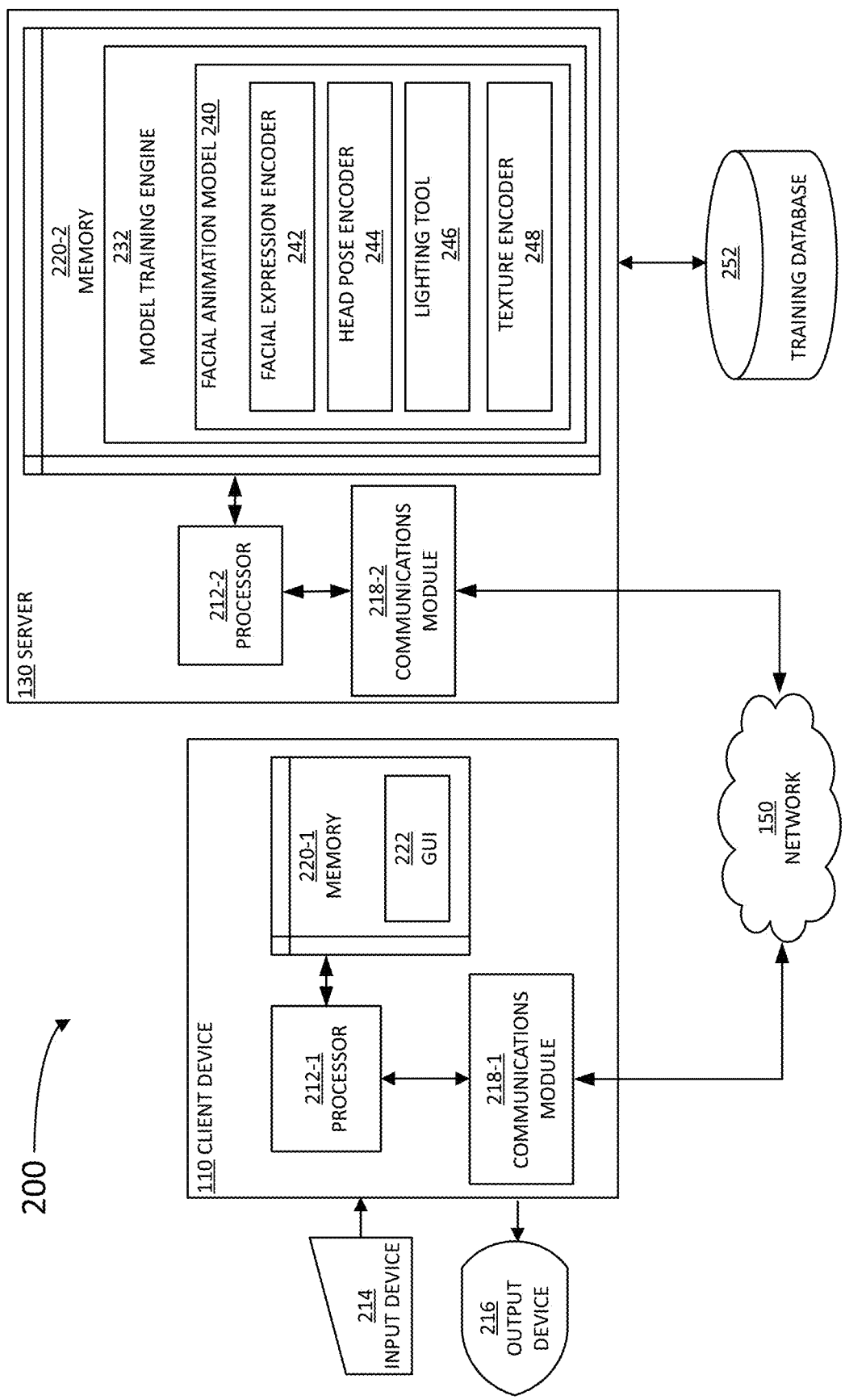
FIG. 2 is a block diagram illustrating an example server and client from the architecture of FIG. 1, according to certain aspects of the disclosure.

FIG. 2 is a block diagram 200 illustrating an example server 130 and client device 110 from architecture 100, according to certain aspects of the disclosure. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices on the network. Communications modules 218 can be, for example, modems or Ethernet cards. A user may interact with client device 110 via an input device 214 and an output device 216. Input device 214 may include a mouse, a keyboard, a pointer, a touchscreen, a microphone, and the like. Output device 216 may be a screen display, a touchscreen, a speaker, and the like. Client device 110 may include a memory 220-1 and a processor 212-1. Memory 220-1 may include a GUI 222, configured to run in client device 110 and couple with input device 214 and output device 216. GUI 222 may be downloaded by the user from server 130, and may be hosted by server 130.

Server 130 includes a memory 220-2, a processor 212-2, and communications module 218-2. Hereinafter, processors 212-1 and 212-2, and memories 220-1 and 220-2, will be collectively referred to, respectively, as "processors 212" and "memories 220." Processors 212 are configured to execute instructions stored in memories 220. In some embodiments, memory 220-2 includes a model training engine 232. Model training engine 232 may share or provide features and resources to GUI 222, including multiple tools associated with managing a creative project. The user may access model training engine 232 through GUI 222 installed in a memory 220-1 of client device 110. Accordingly, GUI 222 may be installed by server 130 and perform scripts and other routines provided by server 130 through any one of multiple tools. Execution of GUI 222 may be controlled by processor 212-1.

In that regard, model training engine 232 may be configured to create, store, update and maintain a facial animation model 240, as disclosed herein. Facial animation model 240 may include encoders, decoders, and tools such as a facial expression encoder 242, a head pose encoder 244, a lighting tool 246, and a texture encoder 248. In some embodiments, model training engine 232 may access one or more machine learning models stored in a training database 252. Training database 252 includes training archives and other data files that may be used by model training engine 232 in the training of a machine learning model, according to the input of the user through GUI 222. Moreover, in some embodiments, at least one or more training archives or machine learning models may be stored in either one of memories 220, and the user may have access to them through GUI 222.

Facial expression encoder 242 determines facial expression parameters (z) based on input images, based on a classification scheme that is learned by training. Head pose encoder 244 determines a rotation (e.g., a matrix, r) and a translation (e.g., a vector, t) of the head of a person in the input images. In some embodiments, head pose encoder 244 may also determine a camera viewpoint vector (v'). Lighting tool 246 includes a lighting model $G_\varphi$ that may be used to relight a 3D representation of an input image according to learned lighting sources, shades, or other elements captured from the input image. Texture encoder 248 provides a brilliance, color, reflectance, and other optical properties of a 3D representation of an input image based on the learned lighting sources and shades.

In some embodiments, the machine learning model may include a neural network (NN), a convolutional neural network (CNN), a generative adversarial neural network (GAN), a deep reinforcement learning (DRL) algorithm, a deep recurrent neural network (DRNN), a classic machine learning algorithm such as random forest, k-nearest neighbor (KNN) algorithm, k-means clustering algorithms, or any combination thereof. More generally, the machine learning model may include any machine learning model involving a training step and an optimization step. In some embodiments, training database 252 may include a training archive to modify coefficients according to a desired outcome of the machine learning model. Accordingly, in some embodiments, model training engine 232 is configured to access training database 252 to retrieve documents and archives as inputs for the machine learning model. In some embodiments, model training engine 232, the tools contained therein, and at least part of training database 252 may be hosted in a different server that is accessible by server 130.

Figure 3:
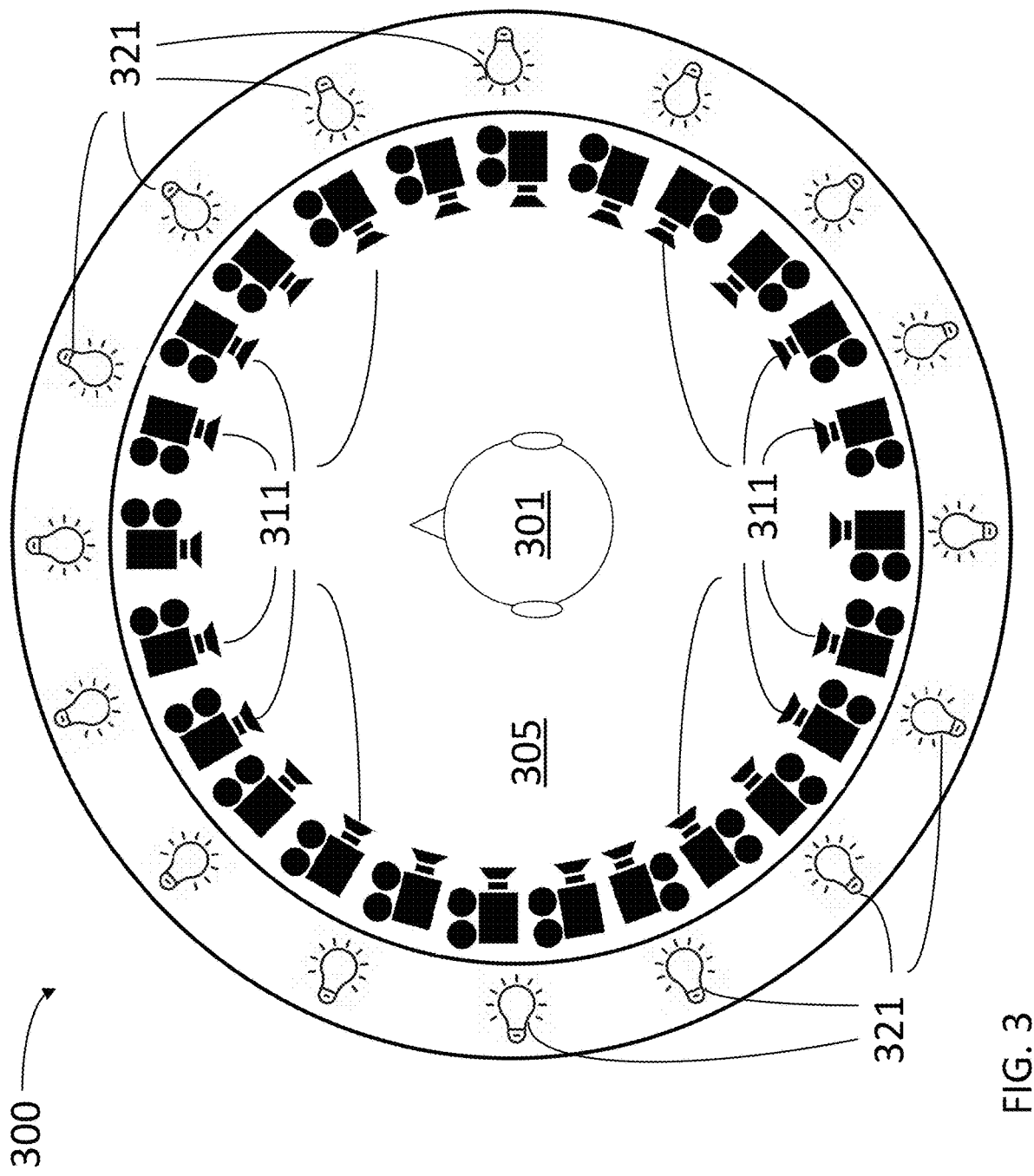
FIG. 3 illustrates a multi-camera video system for an offline training of a person-specific deep appearance model, according to some embodiments.

FIG. 3 illustrates a multi-camera video system 300 for an offline training of a person-specific deep appearance model, according to some embodiments. Video system 300 includes multiple illumination sources 321 and video cameras 311, arranged around a participant 301. Video system 300 may also include a background scenario 305, which may be adjusted accordingly (e.g., a closed room or environment, an outdoor environment, and the like). Illumination sources 321 and video cameras 311 may surround participant 301 over 360° at multiple levels relative to the participant's head: above, below, level with the eyes, and the like. Moreover, in some embodiments, at least one or more of illumination sources 321 and/or video cameras 311 may be moving around participant 301, while a video is captured. In addition to varying intensity, illumination sources 321 may also vary the color gamut of an illumination light provided to participant 301 (e.g., white light undertones, blue undertones, red-orange undertones, and the like).

In some embodiments, each participant 301 is captured by video cameras 311 performing multiple gestures (e.g., one, two, six times, or more), using multiple lighting configurations within a variety of backgrounds 305. Each video capture may last a few seconds or up to several minutes (e.g., 8 or 10 minutes), during which participant 301 would show a variety of facial expressions and read aloud several sentences. In some embodiments, participant 301 simply rotates one of video cameras 311 in selected increments (e.g., 90 degrees), and modifies the lighting configuration by turning illumination sources 321 'on' or 'off' on either side of their face, for different captures. Any configuration for illumination sources 321 may be used as desired. At each frame, video system 300 collects two or more images, $\{I^0, I^1\}$, wherein each image is collected by a different video camera 311, at a different angle or perspective.

Figure 4:
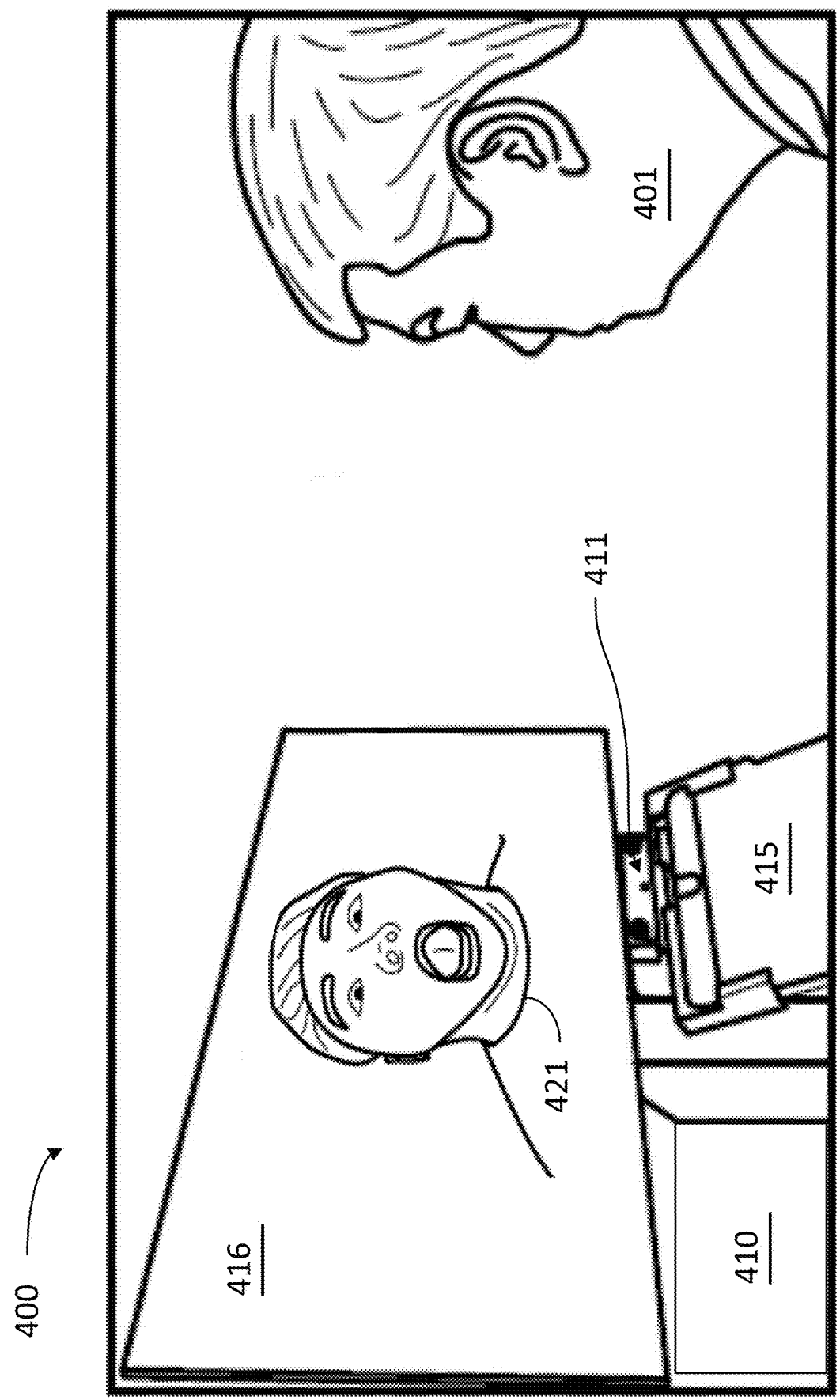
FIG. 4 illustrates a data capture setup for capturing a user's facial expression to train a facial animation model to provide a 3D avatar in real-time, according to some embodiments.

FIG. 4 illustrates a data capture setup 400 for capturing a facial expression of a user 401 to train a facial animation model to provide a 3D avatar 421 in real-time, according to some embodiments. Setup 400 includes a camera 411 (e.g., a custom binocular webcam), a desktop mount 415, and a computer 410 with custom capture software to record frames from camera 411. Camera 415 may include a binocular system having two cameras separated by a distance of a few centimeters (cm), e.g., 10 cm and the like, and configured to collect color images (e.g., Red-Green-Blue pixels) and infrared (IR) images of user 401 (RGB-IR cameras).

In some embodiments, camera 411 includes f/2.0 lenses to provide a wide field of view (FOV). In some embodiments, the FOV may include a horizontal-FOV (HFOV) of about 35° and vertical-FOV (VFOV) of about 43°. The lenses in camera 411 may be focused to a common desktop-mount distance for user 401 (e.g., approximately 0.5 m). Camera 411 may include a custom camera controller to simultaneously capture images from the two cameras at 60 frames-per-second (FPS) and send them to computer 410 over a fast connection (e.g., USB 3.0). The images may include large files, such as 2 mega-pixel (MP, 1300×1600 pixel grid). Custom software on computer 410 is used to perform debayer of the RGB pixels, e.g., to convert a color filter array image into a regular RGB color image. In some embodiments, an IR channel may be used to provide depth information, and the like. The debayered images may be suitably encoded into a video in computer 410. Camera 411 may also be configured to capture audio, and in some embodiments, a single channel audio may be recorded separately using a smart phone or some other device.

A facial animation model as disclosed herein may be running in computer 410, and process the binocular image of user 401 captured by camera 411 to provide an image in a display 416 of 3D avatar 421. Accordingly, 3D avatar 421 may reflect one or more expressions of user 401 immersed in a virtual reality environment created by computer 410. The image in display 416 may be provided to a VR or AR headset to a remote user, synchronously with user 401, or asynchronously.

Figure 5:
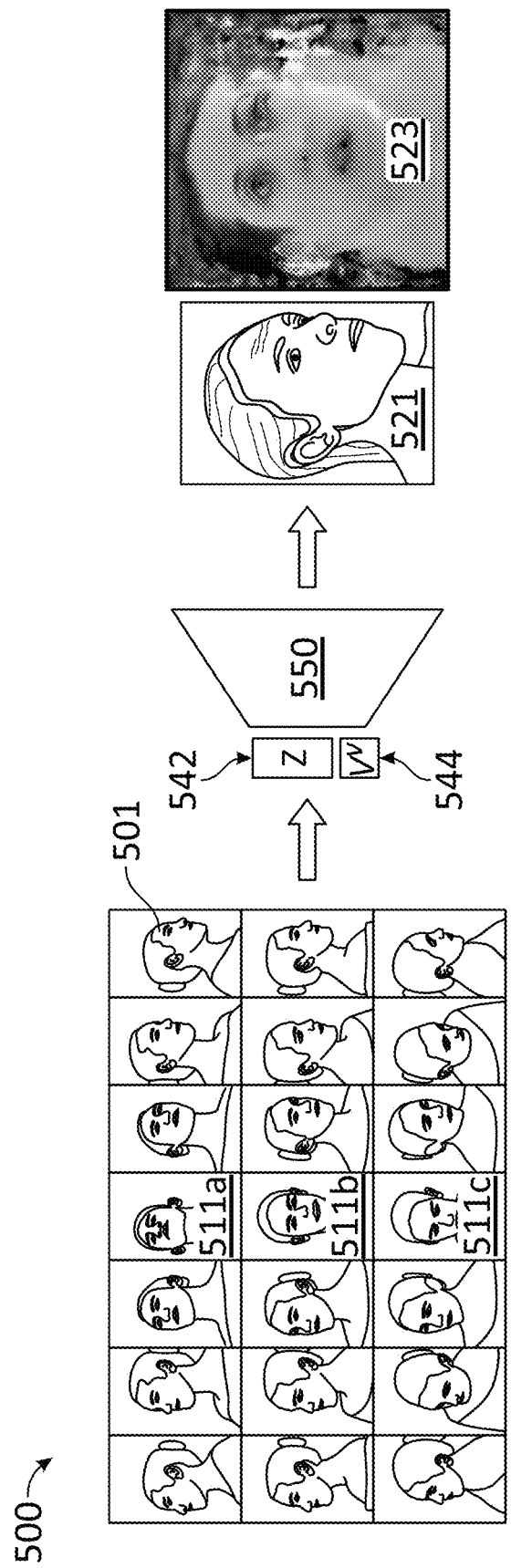
FIG. 5 is a block diagram illustrating exemplary steps and components in a deep appearance model (DAM) for face rendering, according to some embodiments.

FIG. 5 is a block diagram illustrating exemplary steps and components in a person specific, deep appearance model (PS-DAM) encoder 500 for face rendering, according to some embodiments. Multiple views from a subject 501 are collected to form raw input images from the bottom 511a, from a middle level 511b (e.g., eye level), and from the top 511c (hereinafter, collectively referred to as "raw images 511") of subject 501. In some embodiments, raw images 511 may be collected from a multi-camera system as disclosed herein (e.g., video system 300).

Encoder 500 may apply an offline analysis-by-synthesis method on each frame in raw images 511 including facial expression code 542, and a viewing vector 544 to estimate accurate rigid and non-rigid face parameters in novel lighting environments. The pairs of images and face parameters are used as training data to train an encoder for real-time inference. A decoder 550 includes executable code to generate a view-dependent 3D avatar 521 and a face texture 523. 3D avatar 521 is a solid model including depth information and relative positioning for the anatomic features of subject 501. Face texture 523 includes color, hue, and brilliance of the anatomic features of subject 501 (e.g., skin, hair, eyes, and the like).

Figure 6:
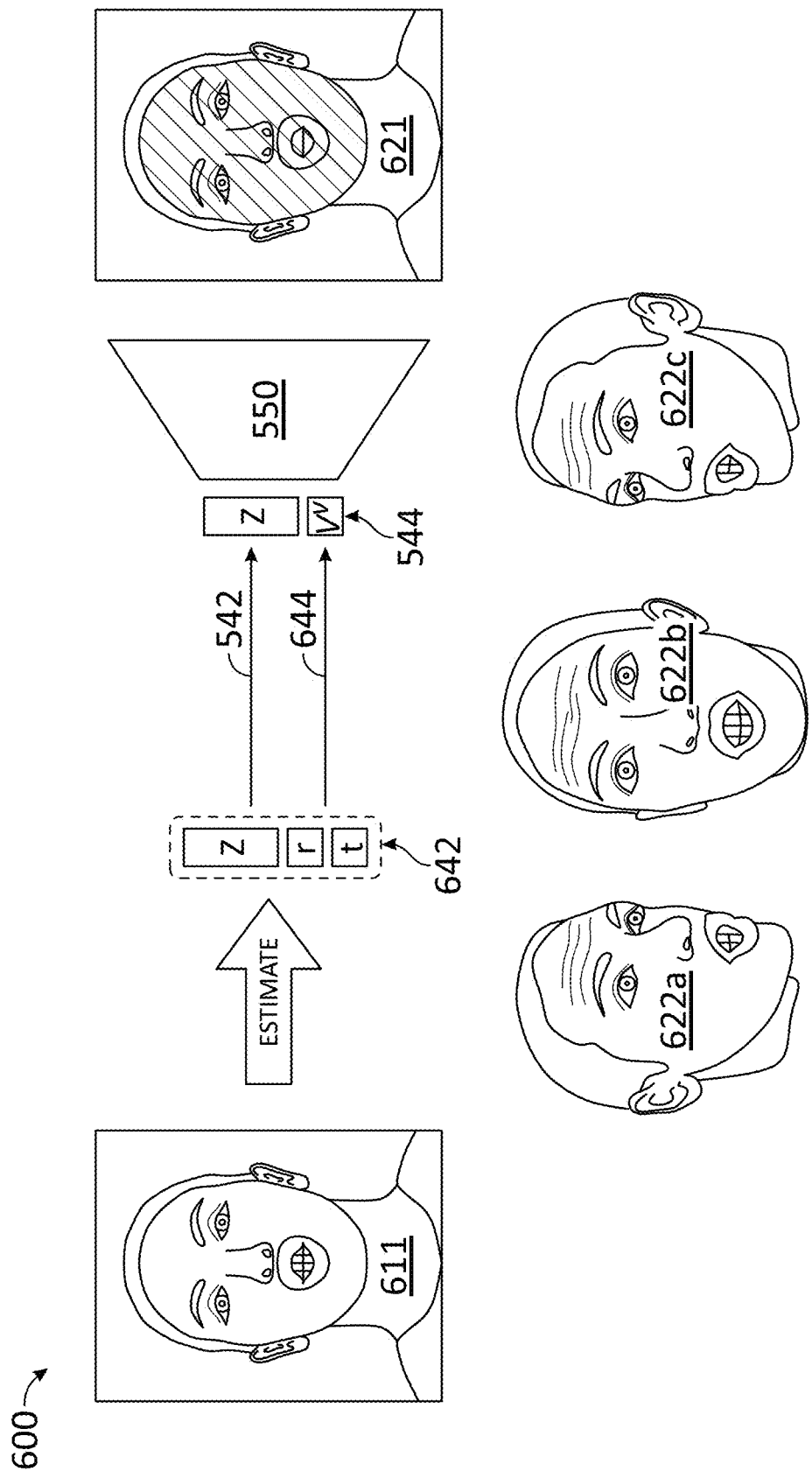
FIG. 6 illustrates an encoder to capture a facial expression and a head pose from a raw image to provide a 3D avatar in real-time, according to some embodiments.

FIG. 6 illustrates an encoder 600 to capture a facial expression 542 and a head pose 644 from a test image 611 to provide a 3D avatar 621 in real-time, according to some embodiments. A head pose 644 may include position, r, and tilt, t, of the rigid head of a subject (no expression). In a real-time facial animation stage, encoder 600 takes test image 611 from a user's new input video and combines a coarse mesh tracking algorithm with the encoder obtained from the offline training step (e.g., encoder 500) to achieve pixel-precise facial animation in real-time. The environments and lighting of the testing scenario (e.g., raw images 511) may be different from those in the training data (e.g., test image 611). In some embodiments, encoder 600 applies a few-shot learning strategy to include face parameters 642 including rigid (e.g., rotation, r and translation, t) and non-rigid parameters (e.g., facial expression Z) to accurately recover the facial motions of test image 611 with new environments and lighting.

Facial expression 542, head pose 644, and viewing vector 544 are provided as inputs to decoder 550, which generates 3D avatar 621. By selecting viewing vector 544 appropriately, encoder 600 may provide any one of multiple views 622a, 622b, and 622c (hereinafter, collectively referred to as "views 622") of 3D avatar 621.

Figure 7:
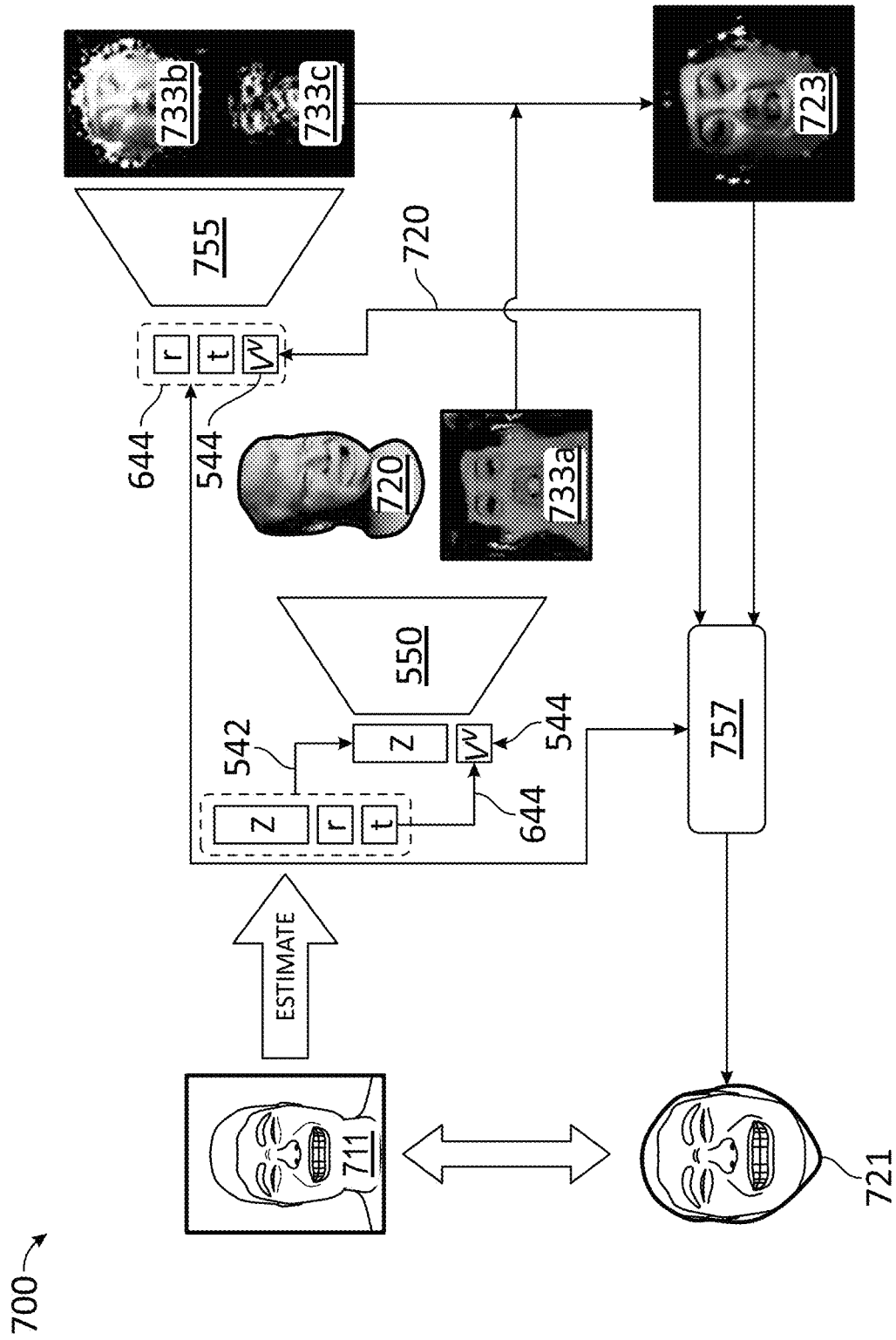
FIG. 7 illustrates an offline facial animation model including a lighting tool, according to some embodiments.

FIG. 7 illustrates an offline facial animation model 700 including a lighting tool 755, according to some embodiments. Given an input image 711, animation model 700 determines a facial expression 542 and a head pose 644. Facial expression 542 and camera viewpoint vector 544 are fed into decoder 550 to extract a face mesh 720 and a relighted texture 733a. Head pose 644, viewpoint vector 544, and face mesh 720 (M) are taken as input to the lighting model 755 ($G_\phi$) to generate a gain map 733b ($G^v$) and bias map 733c ($B^v$), hereinafter collectively referred to as "gain and bias maps 733", which are used to generate relighted texture 733a. Face mesh 720 and relighted texture 733a ($\hat{T}^v$) are then rendered into the original image space to get a relighted avatar 723. We minimize the image loss between this relighted avatar and the input image. A differentiable render layer 757 produces a relighted avatar 721. Avatar 721 is compared with raw image 711 to determine an image loss based on 2D key point loss and an optical flow loss.

Input image 711 may include an image pair, $\{I^v\}$, corresponding to a binocular camera view (e.g., camera 411). Animation model 700 estimates the full state of the face, comprising the rigid head pose 644 and facial expression 542. In some embodiments, animation model 700 includes a Deep Appearance Model (DAM), as described below. The DAM generates mesh 720 and view-dependent texture map 733a as a function of a facial expression code 542 ($z$)$\in R^{256}$.

$$M, T^v \leftarrow D(z, v^v) \tag{1}$$

Here, $M \in R^{n \times 3}$ is the face mesh 720 including n-vertices and $T^v R^{3 \times w \times h}$ is the face texture map 733a with three (3) channels (RGB), a width, w, and a height, h. Viewing direction 544 ($v^v$) is the vector pointing from the center of the head (e.g., user 401) to the camera v (e.g., 411), and is used to account for view-dependent appearance variations such as specularities and texture changes due to imprecise mesh geometry. In some embodiments, parameters for facial animation model 700 may be obtained in a capture stage with uniform lighting, the appearance of image 711 may not span lighting conditions in $\{I^v\}$, captured in unconstrained settings. To compensate for these illumination differences, facial animation model 700 includes an augmented DAM including a color transformation applied to the texture map 733a ($T^v$), as follows:

$$\hat{T}^v = T^v \odot G^v + B^v \tag{2}$$

where, $G^v \in R^{3 \times w \times h}$, and, $B^v \in R^{3 \times w \times h}$ are gain and bias maps 733, and $\odot$ is the element-wise product operator, and $\hat{T}^v$ is relighted texture 733a. To fully describe the appearance effects brought by illumination differences, gain and bias maps 733 depend on the specific illumination condition and other parameters such as rigid head pose 644, facial expression 542, and viewing vector 544. In some embodiments, a neural network model is used to determine these parameters for facial animation model 700. Accordingly, the neural network may include a lighting tool 755 that takes rigid head pose 644 ([r, t]), mesh 720 (M), and camera viewpoint vector 544 ($v^v$) as input:

$$G^v, B^v \leftarrow G_\phi(r, t, M, v^v) \tag{3}$$

where $\phi$ are the network parameters, and $r \in R^3$, $t \in R^3$ are the head rotation and the translation respectively. Eq. 3 assumes that the illumination conditions and the camera are fixed during a capture session. In some embodiments, lighting tool 755 is learned from scratch for every new environment from a small collection of calibration frames. This is performed jointly with the registration process to infer face parameters 642 and camera vector 544. In some embodiments, lighting model 755 compensates for miss-registration due to overfitting of the neural network by restricting the resolution of the network outputs. Accordingly, in some embodiments, a coarse mesh 720 as input, instead of the full expression code, largely avoids overfitting when sufficiently good initialization is provided, as described next.

Given the rigid head pose 644 ([r, t]), the generated mesh 720 (M), and transformed (e.g., relighted) texture 733a, $\hat{T}^v$, we can project the face mesh to the original image space using intrinsic camera parameters $\Pi^v$, and rasterize it to render relighted avatar 723 ($\hat{I}^v$):

$$M^v = \wp(M, r, t | \Pi_v)$$

$$\hat{I}^v = \mathcal{R}(M^v, \hat{T}^v) \tag{4}$$

where $\Pi v$ is the projection operator based on the camera intrinsic matrix $\Pi v$, $\mathcal{R}$ is the rasterization operator and $M^v$ is the projected face mesh in screen space. In this way we can render the relighted avatar 723, $\hat{I}^v$, in the original image space, and formulate the analysis by synthesis image loss, $\mathcal{L}$:

$$\mathcal{L}_{im}(p, \phi) = \Sigma_v(\|I^v - \hat{I}^v\|_1 + \lambda_{lap}\|\Delta I^v - \Delta \hat{I}^v\|) \tag{5}$$

where p=[r, t, z] corresponds to the vector of face parameters (e.g., head pose 644, viewpoint vector 544), $\Delta$ is the image Laplacian operator and $\lambda_{lap}$ is the weight of image Laplacian loss. In some embodiments, a weight value may include $\lambda_{lap}$=0.2, or similar values. In some embodiments, Eq. 5 defines a non-linear optimization problem that may include local minima. To provide a good initialization for the optimization, for each input image $I^v$, in some embodiments, facial animation model 700 detects ninety six (96) two-dimensional (2D) face landmarks $\{L^v_k\}$, that correspond to face features such as mouth corner, nose tip, and/or face contour. For each landmark, k, facial animation model 700 finds the corresponding vertex index on the face mesh denoted as $l_k$, and calculates the $L_2$ distance between 2D face landmark and its corresponding mesh vertex projection:

$$\mathcal{L}_{land}(P) = \Sigma_{v,k} \|L_k^v - M_{l_k}^v\| \tag{6}$$

where $M^v$ is the projected face mesh in screen space calculated by Eq. 4. At each step during the optimization, given the current estimated face parameters pc and a lighting model $G_\phi$, we can render the relighted avatar 723 ($\hat{I}_c^v$), using Eq. 4. Facial animation model 700 then calculates the dense optical flow between relighted avatar 723 ($\hat{I}_c^v$) and input image 711 ($I^v$), and maps the dense optical flow to the projected mesh vertices $M^v_c$ in screen space through bilinear interpolation, annotated by $D^v = \{d^v_i\}$. Facial animation model 700 formulates the optical flow loss as the $L_2$ distance between the current projection of the face mesh $M^v$ and the flow-predicted location $M^v_c + D^v$:

$$\mathcal{L}_{flow}(p) = \Sigma_v \|M^v - M_c^v - D^v\|^2 \tag{7}$$

With the losses formulated in Eqs. 5-7, facial animation model 700 can optimize face parameters 544 and 644 of some, most, or all frames by solving the following equation:

$$\min_{\{p_l\},\phi} \sum_k \mathcal{L}_{im} + \lambda_{land} \cdot \mathcal{L}_{land} + \lambda_{flow} \cdot \mathcal{L}_{flow} \tag{8}$$

where pt is the face parameter vector at frame t. $\lambda_{land}$ and $\lambda_{flow}$ are used to control the weights of landmark loss and optical flow loss and may have any suitable value, such as $\lambda_{land}$=1.0 and $\lambda_{flow}$=3.0. These optimized face parameters are regarded as the ground truth parameters in training an encoder as disclosed herein (e.g., encoders 242, 500, or 600), and are denoted as p★=[r★, t★, z★].

Figure 8:
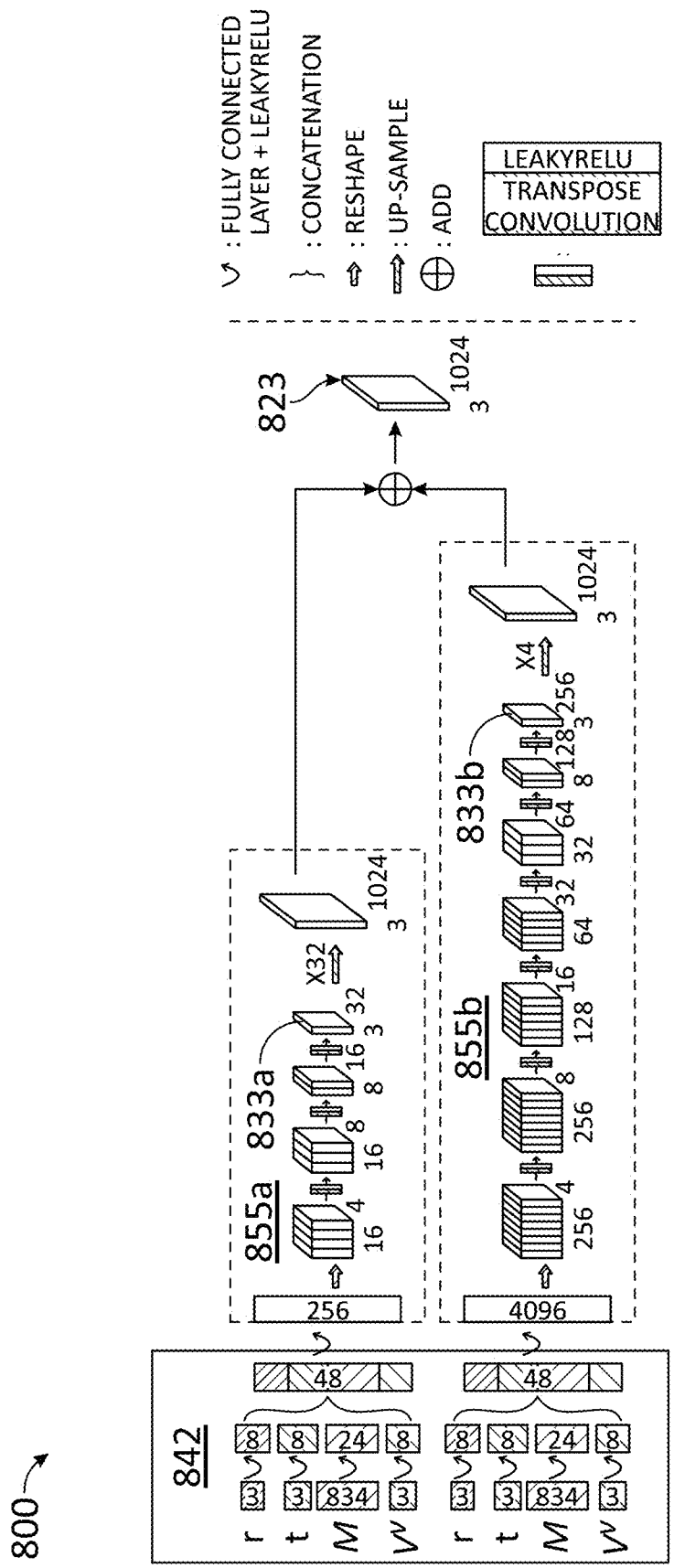
FIG. 8 illustrates a schematic diagram of a coarse-to-high resolution network architecture that combines a low-resolution architecture and a high-resolution architecture for a lighting tool, according to some embodiments.

FIG. 8 illustrates a schematic diagram of a coarse-to-high resolution network architecture 800 that combines a low-resolution architecture 855a and a high-resolution architecture 855b for a lighting tool, according to some embodiments. Network architecture 800 is able to recover correct facial expression and reconstruct the captured lighting. The input to network architecture may include a set of captured images {I$^v$}, the detected 2D face landmarks {L$^v_k$}, and the intrinsic camera parameters $\Pi_v$. Other parameters of consideration are face parameters 842 ([r,t,z]), and the network parameters $\phi$ of the lighting model $G_\phi$. In some embodiments, network architecture 800 renders the relighted avatar $\hat{I}_c^v$, calculates dense optical flow, and formulates the optical flow loss. In some embodiments, a lighting model, $G_\phi$ (cf. lighting model 755), describes appearance effects brought by illumination differences between the DAM and the real data. To avoid over fitting of lighting model $G_\phi$ (e.g., the model reconstructs the relighted avatar $\hat{I}_c^v$, matching input image I$^v$, but with wrong facial expressions), network architecture 800 is used. More generally, network architecture 800 is configured to resolve Eq. 8 in several blocks, which are listed below.

Block 1: minimizing the landmark loss (cf Eq. 6) to obtain the face parameters 842 of each frame.

Block 2: fixing face parameters 842, optimize lighting model parameters $\phi_l$ to minimize $L_{im}$ (cf. Eq. 5). In some embodiments, coarse-to-fine network architecture 800 avoids overfitting by first optimizing a low-resolution version of the lighting model parameters $\phi_l$ (cf. low-resolution architecture 855a, including blocks of 16×16 pixel frames). In some embodiments, only the low-resolution lighting model, $G_{\phi l}$, is optimized at block 2, which outputs 32×32 gain and bias maps 833. In some embodiments, block 2 includes up-sampling the gain and bias maps using bi-cubic interpolation to match the texture resolution, 1024×1024.

Block 3: with the optimized face parameters 842 ($p$) and $\phi_l$, render a relighted avatar $\hat{I}_c^v$ (cf. Eq. 4), and calculate the dense optical flow between $\hat{I}_c^v$ and input image I$^v$; formulate the optical flow loss as Eq. 7, fix the lighting model, and optimize face parameters 842 ($p$), per-frame, by minimizing the image loss, landmark loss, and optical flow loss (Eqs. 5-7).

Block 4: jointly optimize $\phi_l$ and face parameters 842 ($p$) to further minimize the loss. The output low-resolution gain and bias maps help to avoid overfitting, and obtain accurate facial expression codes in block 3 and block 4.

Block 5: fix the low-resolution lighting model's parameters $\phi_l$, and jointly optimize face parameters 842 ($p$) and high-resolution lighting model parameters $\phi_h$, to refine the results according to Eq. 8. In some embodiments, block 5 also includes fixing the low-resolution lighting model but optimizes another high-resolution lighting model $G_{\phi h}$, which outputs 256×256 gain and bias maps 833b, to refine the details of the face. A combination layer 823 merges the low resolution and high resolution gain and bias maps 833a and 833b.

Figure 9:
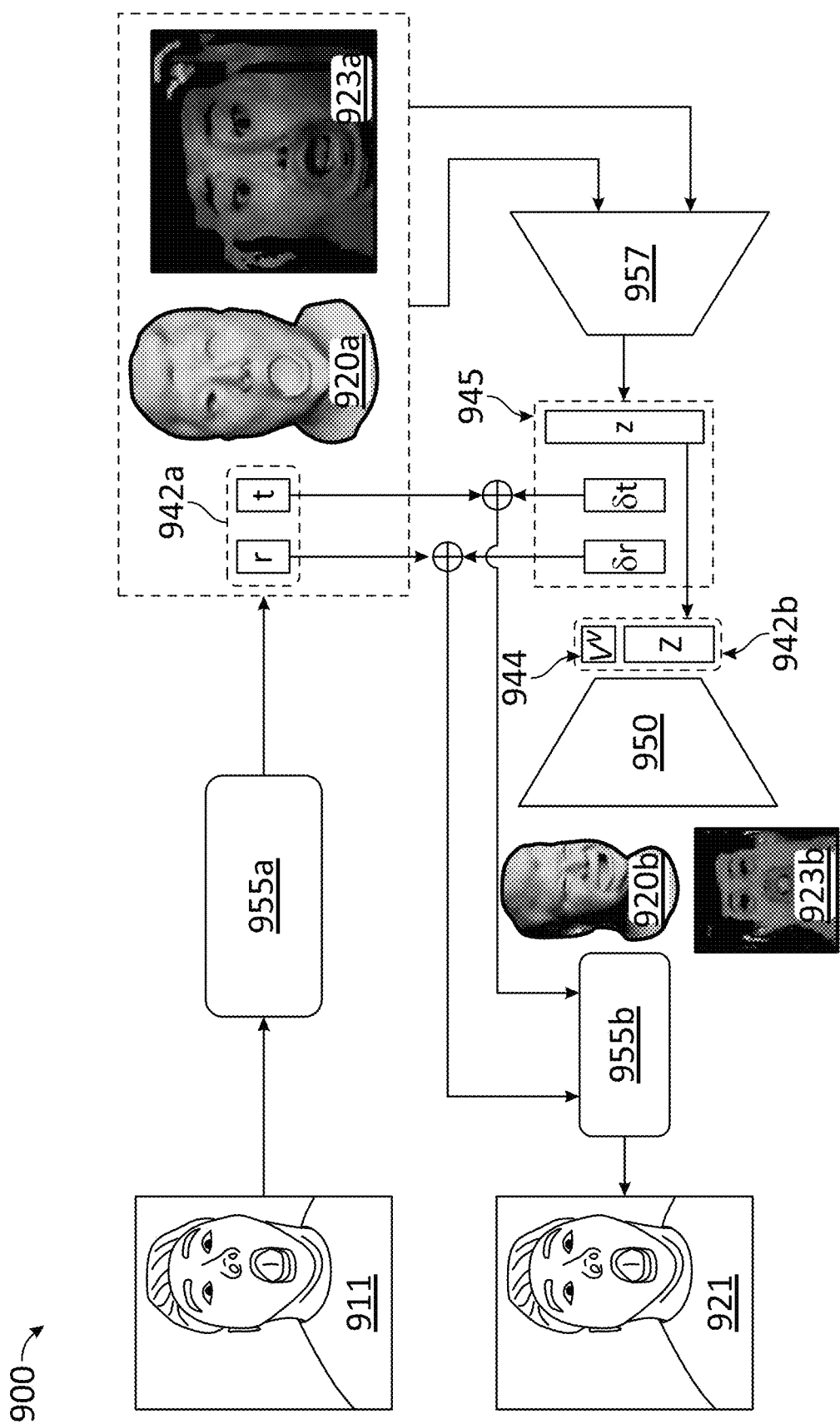
FIG. 9 illustrates a block diagram in a real-time facial animation model, according to some embodiments.

FIG. 9 illustrates a block diagram in a real-time facial animation model 900, according to some embodiments. In some embodiments, facial animation model 900 includes a direct regressor that allows real-time inference, based on the training data generated by an offline face model fitting 955b (cf. offline facial animation model 700). Facial animation model 900 includes an increment regression encoder 957 that provides incremented facial parameters 945. Incremented facial parameters 945 include shifts in head position, $\delta r$, $\delta t$.

A coarse mesh tracking 955a runs on an input image 911 to obtain face parameters 942a, a mesh 920a, and a texture map 923a. Mesh 920a and un-warped texture 923a are taken as input of an encoder 957 to regress facial parameters including camera view vector 944, based on incremental facial parameters 945. A regressed expression code 942b, together with camera view vector 944, are fed into a DAM decoder 950 to extract the face mesh 920b and texture 923b. Offline face model fitting 955b uses mesh 920b, texture 923b, and rigid head pose 942a to render a 3D avatar 921. In some embodiments, a few-shot learning strategy may be used to train increment regression encoder 957 to compensate for different illumination configurations in test videos.

In some embodiments, a real-time, coarse mesh tracking 955a includes a linear Principal Components Analysis (PCA) model based on the tracked mesh 920a, annotated by $\{\overline{A}, A1, A2, \ldots, Am\}$, where $\overline{A}$ is the average face and A1, A2, ..., Am are the principal components basis. Denoting a PCA coefficient vector as $a=\{a_1, a_2, \ldots, a_m\}$, coarse mesh tracking 955a generates face mesh 920a as a linear combination of the PCA basis: $M=\overline{A}+\sum_j a_j A_j$. At each frame, for each input image 911 (I$^v$), coarse mesh tracking 955a detects 2D face landmarks {L$^v_k$} using a real-time generic detector. Similar to the landmark loss (cf Eq. 6), coarse mesh tracking 955a transforms the face mesh 920a (M) using rigid head pose 942a ([r, t]) and project it to image space using camera intrinsic matrix $\Pi v$. Coarse mesh tracking 955a penalizes the $L_2$ distance between the 2D landmarks and their corresponding mesh vertices projection:

$$M^v = \mathcal{R}(M, r, t | \Pi_v),$$

$$\mathcal{L}_{track}(r, t, a) = \sum_{v,k} \|L_k^v - M_{I_k}^v\|^2 \quad (9)$$

In some embodiments, coarse mesh tracking 955a includes a non-linear least squares minimization to optimize $L_{track}$ (cf. Eq. 9), and obtain coarse mesh parameters 942a ([r, t, a]) for each frame. In some embodiments, a fast solver may be used to achieve the real-time performance at runtime.

Some embodiments train encoder 957 for each input image pair {I$^v$}, with coarse mesh 920a and corresponding ground-truth face parameters p★. Un-warp input image IP into the texture space with projected coarse mesh 920a (M$^v$) to get the captured textures T$^v$. Encoder 957 takes coarse mesh 920a and un-warped texture 923a, {T$^v$}, as input, and outputs the expression code Z and rigid head pose increments:

$$\delta r, \delta t \leftarrow E_\psi(\mathcal{M}(T^v)), \quad (10)$$

where $\psi$ are the network parameters of the encoder. Incremented facial parameters 945 are applied to the estimated head pose from coarse mesh tracking 955a: r+$\delta r$, t+$\delta t$. A parameter loss includes the $L_2$ distance between the regressed results and the ground truth parameters:

$$\mathcal{L}_{param}(\psi) = \lambda_r \|r + \delta r - r^\star\|^2 + \lambda_t \|t + \delta t - t^\star\|^2 + \lambda_z \|z - z^\star\|^2 \quad (11)$$

where $\lambda_r$, $\lambda_t$, and $\lambda_z$ are weights to balance the units of rotation, translation, and expression code, and we choose $\lambda_r$=1e3, $\lambda_t$=1e-2 and $\lambda_z$=10 in some embodiments. Additionally, with the regressed face parameters 942a and the lighting model $G_\phi$ (cf. lighting model 755), render tool 955b renders relighted avatar 921 (cf. Eqs. 1-4), and defines a loss directly in image space (cf. Eq. 5). Some embodiments optimize ψ with 200 epochs by minimizing the parameter loss (cf. Eq. 11), and then further optimize ψ with 50 epochs by minimizing the image loss (cf. Eq. 5).

Figure 10:
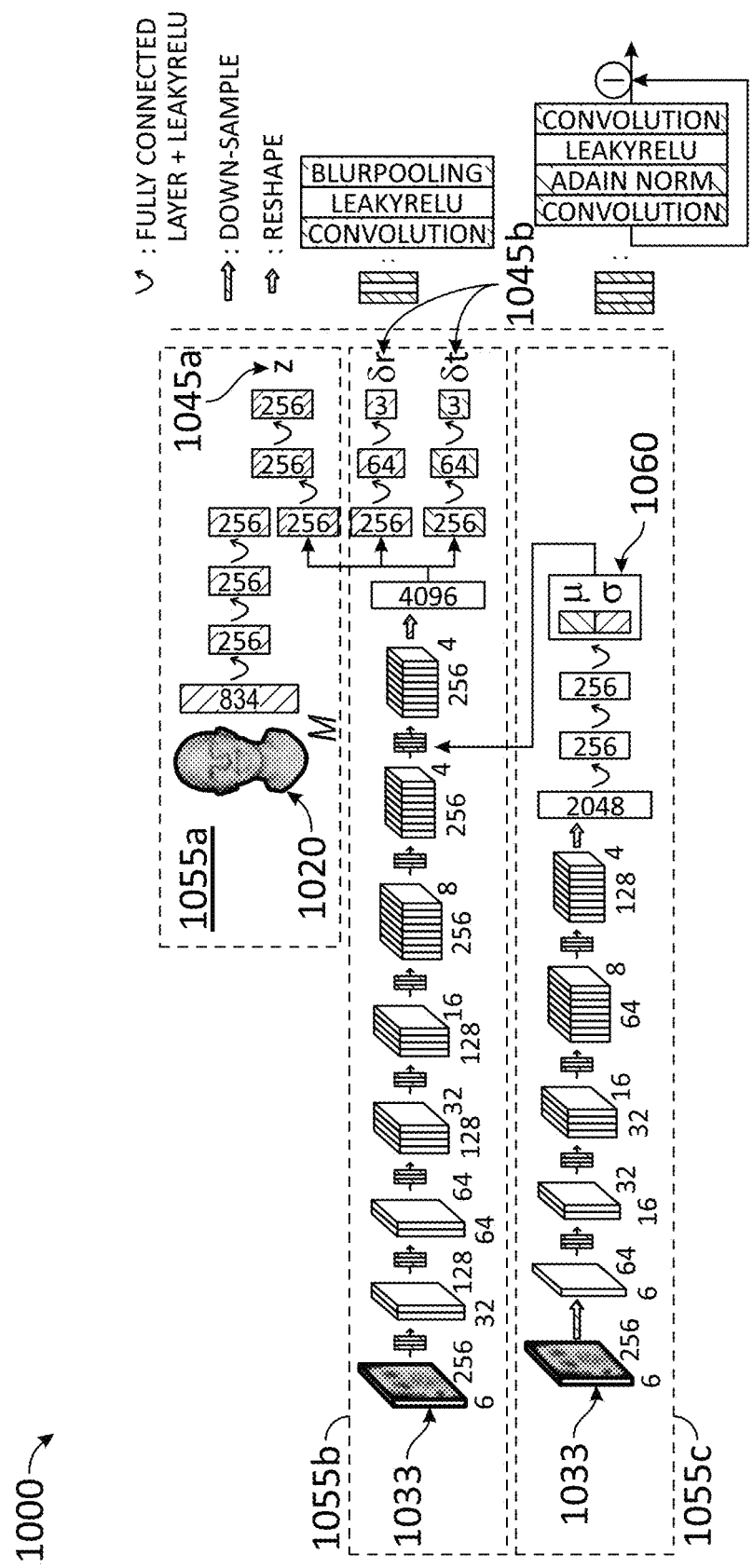
FIG. 10 illustrates a network architecture for a facial animation model configured to account for different environmental conditions of an image in a few shots from the subject, according to some embodiments.

FIG. 10 illustrates a network architecture 1000 for a facial animation model configured to account for different environmental conditions of an image in a few shots from the subject, according to some embodiments. The environments and the lighting of the test scenarios may be different from the one of training data, thus directly applying the pre-trained encoder (e.g., encoders 242, 244, 248, 500, 600, and 957) to data from new environments may lead to biased results. Network architecture 1000 includes a mesh branch 1055a, a texture branch 1055b, and an embedder branch 1055c (hereinafter, collectively referred to as "branches 1055").

Mesh branch 1055a takes a coarse mesh 1020 (M) as input to sample a number of vertices (e.g., 274 or more) and constructs a position vector using the 3D locations of these vertices, which is transformed using several fully-connected layers to get the latent vector. Texture branch 1055b takes an un-warped texture 1033 {T"} as input, down-samples it (e.g., to 256×256 size frames), and encodes it using multiple convolutional layers (e.g., two, three, seven, or even more), with each layer followed by a blur-pooling layer. The output is reshaped to any suitable size, e.g., to a 4096 dimensional vector, and passed to several fully-connected layers to get a latent vector 1045b. This vector is concatenated with the latent vector from the mesh branch, from which the expression code 1045a (z) is regressed. Rigid head pose increments δr and δt 1045b are similarly regressed in texture branch 1055b.

Embedder branch 1055c allows for few-shot learning of new environments in an encoder. In some embodiments, embedder branch 1055c takes an un-warped texture 1033 {T"} as input. Embedder branch 1055c may include similar convolution layers as texture branch 1055b, followed by two fully-connected layers to get adaptive parameters 1060 {μ, σ}, which are applied to adaptive instance normalization layers in texture branch 1055b. In general, it is desirable to learn embedder branch 1055c such that adaptive parameters 1060 {μ, σ} contain video specific lighting information. When an input test video includes a novel lighting environment, network architecture 1000 first uniformly samples K frames from the first few seconds of the test video (e.g., 30 seconds or so). An offline face estimation model estimates the face parameters for these frames (e.g., offline facial animation model 700). To prevent the lighting model $G_\varphi$ (e.g., lighting model 755) from overfitting on these K-frames, network architecture 1000 selects a pre-trained lighting model trained on one of this user's training video, and fine-tunes it (cf blocks 2 and 5 in network architecture 800), instead of starting from scratch. Network architecture 1000 defines the parameter loss (cf. Eq. 11) and image loss (cf. Eq. 5), and adapts the pre-trained encoder. In some embodiments, after 50 epochs, the adapted encoder can work well on the remaining frames of the test video.

Figure 11:
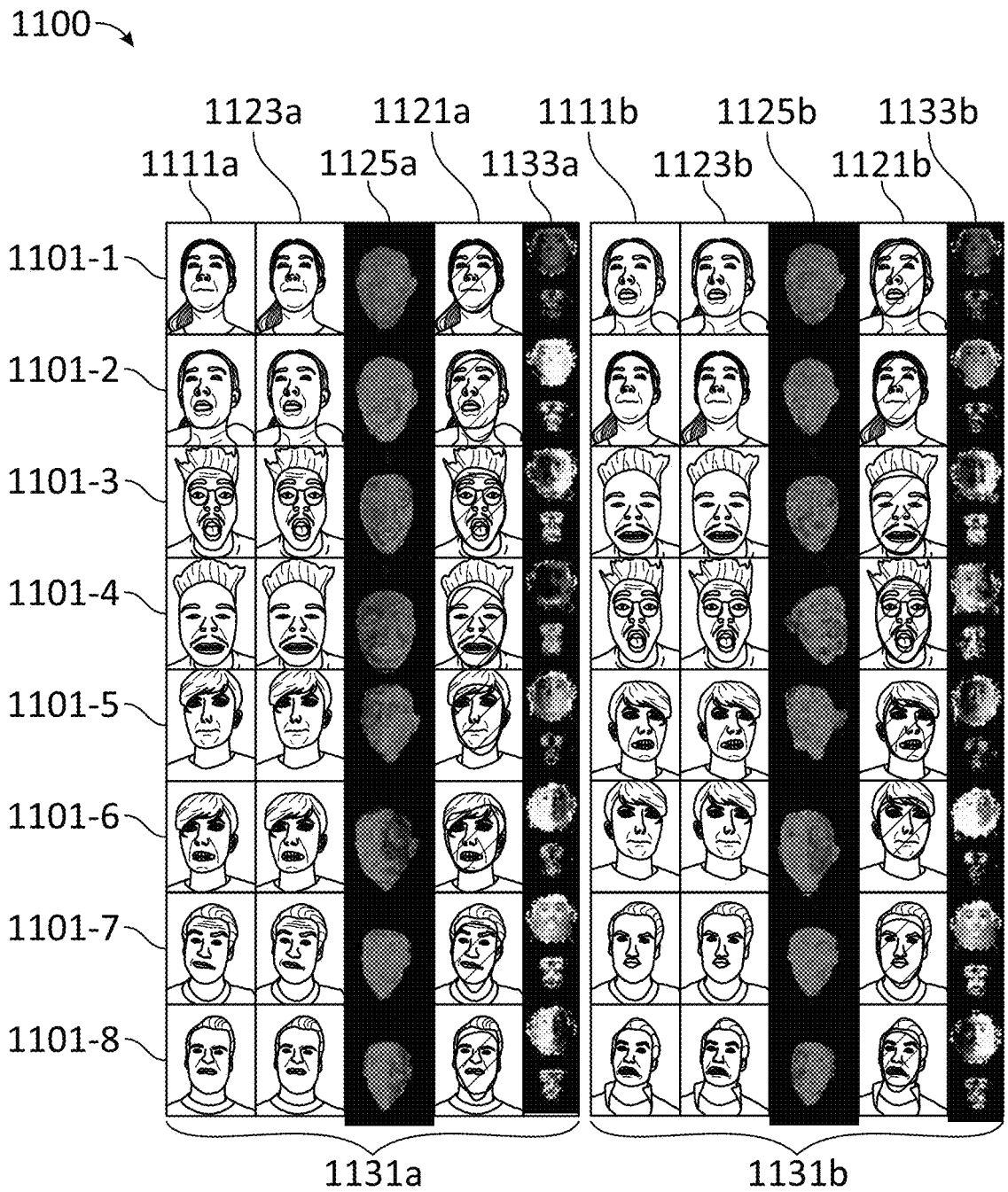
FIG. 11 illustrates 3D avatars provided by an offline facial animation model for different subjects under different lighting conditions, according to some embodiments.

FIG. 11 illustrates a chart 1100 including 3D avatars 1121a and 1121b (hereinafter, collectively referred to as "avatars 1121") provided by an offline facial animation model for different subjects 1101-1, 1101-2, 1101-3, 1101-4, 1101-5, 1101-6, 1101-7, and 1101-8 (hereinafter, collectively referred to as "subjects 1101"), under different lighting conditions in sections 1131a, and section 1131b, according to some embodiments. Input images 1111a and 1111b include, for the same subject 1101, different lighting conditions and different facial expressions. Rendered images 1123a and 1123b, respectively, illustrate the 2D rendition of avatars 1121a and 1121b, respectively, obtained with the offline facial animation model, including reconstruction errors 1125a and 1125b (cf. Eqs. 7-9 and 11). Columns 1133a and 1133b illustrate the gain and bias maps obtained according to some embodiments.

Figure 12:
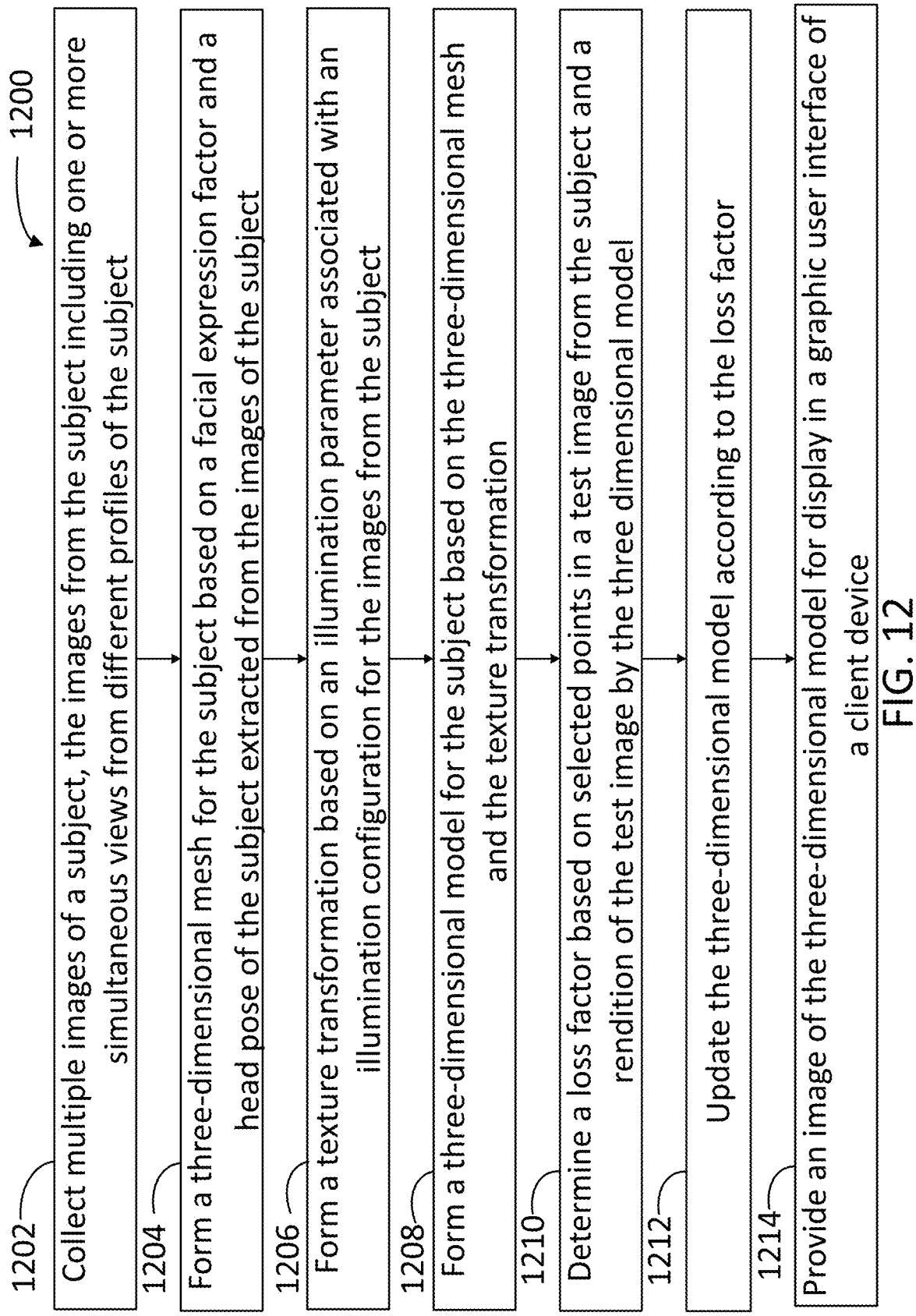
FIG. 12 is a flow chart illustrating steps in a method for training a face animation model to create real-time facial animation from binocular video, according to some embodiments.

FIG. 12 is a flow chart illustrating steps in a method 1200 for training a face animation model to create real-time facial animation from binocular video, according to some embodiments. Method 1200 may be performed by a system including client devices, servers, and at least one database communicatively coupled with each other via communications modules via a network, as disclosed herein (e.g., client devices 110, servers 130, databases 152 and 252, communications modules 218, and network 150). The servers and client devices may include processors configured to execute instructions stored in memories as disclosed herein (e.g., processors 212 and memories 220). In some embodiments, the instructions in a memory may include a model training engine configured to create and update a facial animation model, and a graphic user interface application, as disclosed herein (e.g., model training engine 232, facial animation model 240, and graphic user interface 222). In some embodiments, the facial animation model may include a facial expression encoder, a head pose encoder, a lighting tool, and a texture encoder, as disclosed herein (e.g., facial expression encoder 242, head pose encoder 244, lighting tool 246, and texture encoder 248). Methods consistent with the present disclosure may include at least one or more of the steps in method 1200, performed in a different order, simultaneously, quasi-simultaneously, or overlapping in time.

Step 1202 includes collecting multiple images of a subject, the images from the subject comprising one or more simultaneous views from different profiles of the subject. In some embodiments, step 1202 may include collecting a binocular image from the subject, obtaining a three-dimensional representation of the subject by applying the three-dimensional model to the binocular image from the subject, and embedding the three-dimensional representation of the subject in a virtual reality environment in real-time. In some embodiments, step 1202 includes providing the images from the subject under multiple illumination configurations to a low-resolution multilayered network and to a high-resolution multilayered network, and combining an output from the low-resolution multilayered network with an output of the high-resolution multilayered network.

Step 1204 includes forming a three-dimensional mesh for the subject based on a facial expression factor and a head pose of the subject extracted from the images of the subject. In some embodiments, step 1204 includes identifying a facial expression of the subject in the images, and associating a facial expression factor with the facial expression of the subject. In some embodiments, step 1204 includes identifying a head pose of the subject, the head pose including a rotation of a head of the subject and a translation of the head of the subject.

Step 1206 includes forming a texture transformation based on an illumination parameter associated with an illumination configuration for the images from the subject. In some embodiments, step 1206 includes using a bias matrix and a gain matrix including the facial expression factor, the head pose, and the illumination parameter. In some embodiments, step 1206 includes determining an illumination parameter based on an illumination configuration for the images from the subject.

Step 1208 includes forming a three-dimensional model for the subject based on the three-dimensional mesh and the texture transformation.

Step 1210 includes determining a loss factor based on selected points in a test image from the subject and a rendition of the test image by the three-dimensional model. In some embodiments, step 1210 includes projecting a three-dimensional representation of the subject onto a two-dimensional image and comparing a selected point in the two-dimensional image with a corresponding point in the test image.

Step 1212 includes updating the three-dimensional model according to the loss factor. In some embodiments, step 1212 includes evaluating the loss factor for an incremental change to the head pose over an incremental period of time. In some embodiments, step 1212 includes embedding a statistical value for the illumination parameter in the texture transformation, the statistical value derived from a multi-layered network comprising the images of the subject under multiple illumination configurations.

Step 1214 includes providing an image of the three-dimensional model for display in a graphic user interface of a client device.

Figure 13:
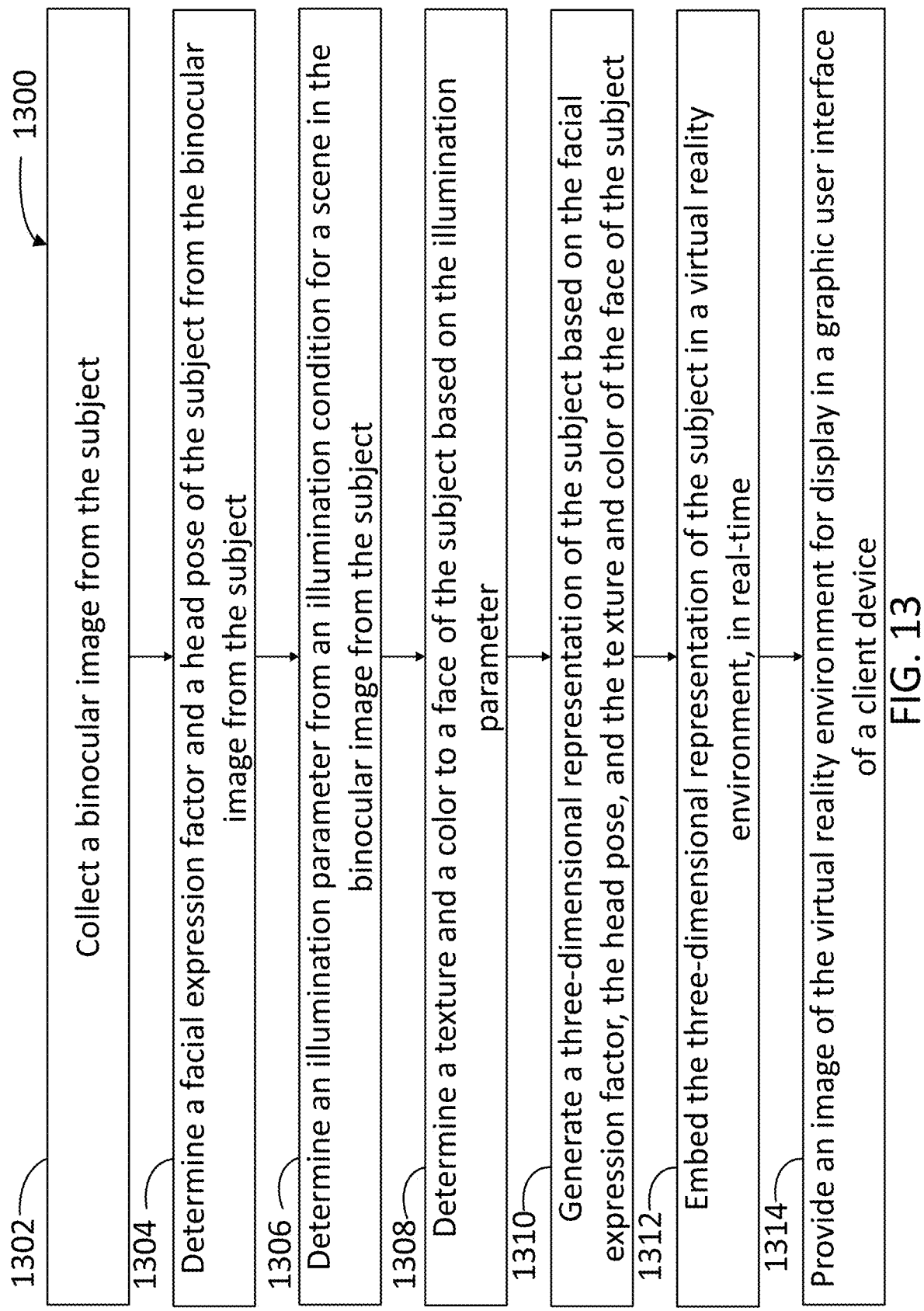
FIG. 13 is a flow chart illustrating steps in a method for embedding a real-time facial animation from a subject in a virtual reality environment, according to some embodiments.

FIG. 13 is a flow chart illustrating steps in a method 1300 for embedding a real-time facial animation from a subject in a virtual reality environment, according to some embodiments. Method 1300 may be performed by a system including client devices, servers, and at least one database communicatively coupled with each other via communications modules via a network, as disclosed herein (e.g., client devices 110, servers 130, databases 152 and 252, communications modules 218, and network 150). The servers and client devices may include processors configured to execute instructions stored in memories as disclosed herein (e.g., processors 212 and memories 220). In some embodiments, the instructions in a memory may include a model training engine configured to create and update a facial animation model, and a graphic user interface application, as disclosed herein (e.g., model training engine 232, facial animation model 240, and graphic user interface 222). In some embodiments, the facial animation model may include a facial expression encoder, a head pose encoder, a lighting tool, and a texture encoder, as disclosed herein (e.g., facial expression encoder 242, head pose encoder 244, lighting tool 246, and texture encoder 248). Methods consistent with the present disclosure may include at least one or more of the steps in method 1300, performed in a different order, simultaneously, quasi-simultaneously, or overlapping in time.

Step 1302 includes collecting a binocular image from a subject.

Step 1304 includes determining a facial expression factor and a head pose factor of the subject from the binocular image from the subject.

Step 1306 includes determining an illumination parameter from an illumination condition for a scene in the binocular image from the subject.

Step 1308 includes determining a texture and a color to a face of the subject based on the illumination parameter.

Step 1310 includes generating a three-dimensional representation of the subject based on the facial expression factor, the head pose factor, and the texture and color of the face of the subject.

Step 1312 includes embedding the three-dimensional representation of the subject in a virtual reality environment, in real-time. In some embodiments, step 1312 includes identifying the illumination parameter based on a selected illumination condition for a virtual scene in the virtual reality environment and a head pose for the subject in the virtual scene. In some embodiments, step 1312 includes determining a loss factor based on selected points in the binocular image from the subject and the three-dimensional representation for the subject, and updating a three-dimensional model according to the loss factor, the three-dimensional model comprising the facial expression factor, the head pose factor, and the illumination parameter.

Step 1314 includes providing an image of the virtual reality environment for display in a graphic user interface of a client device.

Hardware Overview

Figure 14:
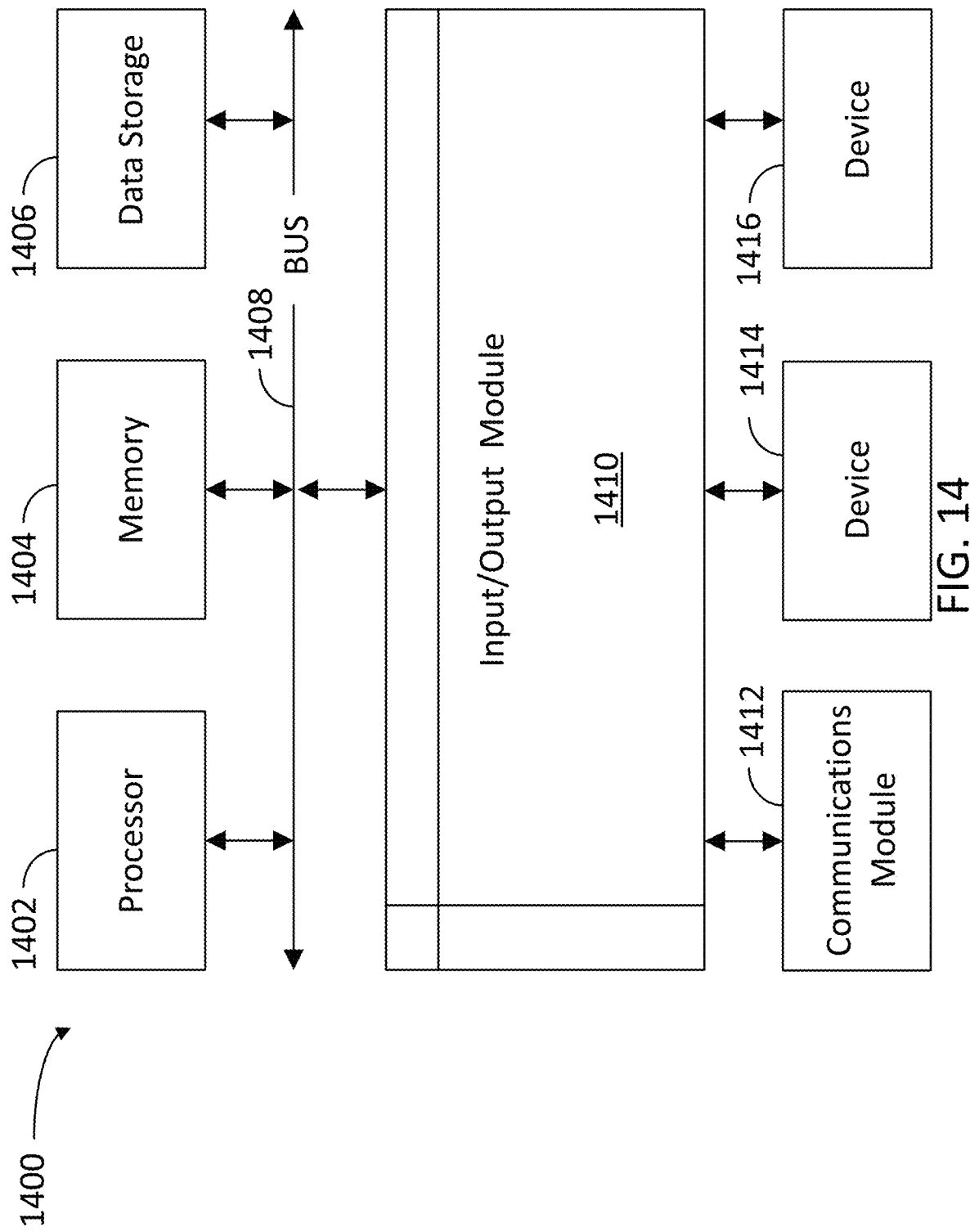
FIG. 14 is a block diagram illustrating an example computer system with which the client and server of FIGS. 1 and 2 and the methods of FIGS. 12-13 can be implemented.

FIG. 14 is a block diagram illustrating an exemplary computer system 1400 with which the client and server of FIGS. 1 and 2, and the methods of FIGS. 12 and 13 can be implemented. In certain aspects, the computer system 1400 may be implemented using hardware or a combination of software and hardware, either in a dedicated server, or integrated into another entity, or distributed across multiple entities.

Computer system 1400 (e.g., client 110 and server 130) includes a bus 1408 or other communication mechanism for communicating information, and a processor 1402 (e.g., processors 212) coupled with bus 1408 for processing information. By way of example, the computer system 1400 may be implemented with one or more processors 1402. Processor 1402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1400 can include, in addition to hardware, code that creates an execution environment for the computer program in question, e.g., code that constitutes processor firmware, a protocol stack, a database management system, an operating system, or a combination of one or more of them stored in an included memory 1404 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1408 for storing information and instructions to be executed by processor 1402. The processor 1402 and the memory 1404 can be supplemented by, or incorporated in, special purpose logic circuitry.

The instructions may be stored in the memory 1404 and implemented in one or more computer program products, e.g., one or more modules of computer program instructions encoded on a computer-readable medium for execution by, or to control the operation of, the computer system 1400, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1404 may also be used for storing temporary variable or other intermediate information during execution of instructions to be executed by processor 1402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1400 further includes a data storage device 1406 such as a magnetic disk or optical disk, coupled to bus 1408 for storing information and instructions. Computer system 1400 may be coupled via input/output module 1410 to various devices. Input/output module 1410 can be any input/output module. Exemplary input/output modules 1410 include data ports such as USB ports. The input/output module 1410 is configured to connect to a communications module 1412. Exemplary communications modules 1412 (e.g., communications modules 218) include networking interface cards, such as Ethernet cards and modems. In certain aspects, input/output module 1410 is configured to connect to a plurality of devices, such as an input device 1414 (e.g., input device 214) and/or an output device 1416 (e.g., output device 216). Exemplary input devices 1414 include a keyboard and a pointing device, e.g., a mouse or a trackball, by which a user can provide input to the computer system 1400. Other kinds of input devices 1414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1416 include display devices, such as an LCD (liquid crystal display) monitor, for displaying information to the user.

According to one aspect of the present disclosure, the client 110 and server 130 can be implemented using a computer system 1400 in response to processor 1402 executing one or more sequences of one or more instructions contained in memory 1404. Such instructions may be read into memory 1404 from another machine-readable medium, such as data storage device 1406. Execution of the sequences of instructions contained in main memory 1404 causes processor 1402 to perform the process steps described herein. One or more processors in a multi-processing arrangement may also be employed to execute the sequences of instructions contained in memory 1404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 1400 can include clients and servers. A client and server are generally remote from each other and typically interact through a communication network. The relationship of client and server arises by virtue of computer programs running on the respective computers and having a client-server relationship to each other. Computer system 1400 can be, for example, and without limitation, a desktop computer, laptop computer, or tablet computer. Computer system 1400 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1402 for execution. Such a medium may take many forms, including, but not limited to, non-volatile media, volatile media, and transmission media. Non-volatile media include, for example, optical or magnetic disks, such as data storage device 1406. Volatile media include dynamic memory, such as memory 1404. Transmission media include coaxial cables, copper wire, and fiber optics, including the wires forming bus 1408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   collecting multiple images of a subject, the images from the subject comprising one or more simultaneous views from different profiles of the subject;
   forming a three-dimensional mesh for the subject based on a facial expression code and a head pose of the subject extracted from the images of the subject;
   forming a texture transformation based on an illumination parameter associated with an illumination configuration for the images from the subject;
   forming a three-dimensional model for the subject based on the three-dimensional mesh and the texture transformation;
   determining a loss factor based on selected points in a test image from the subject and a rendition of the test image by the three-dimensional model; and
   updating the three-dimensional model according to the loss factor, wherein collecting multiple images of the subject comprises selecting the illumination configuration based on a position, an intensity, and a color gamut for each of multiple light sources around the subject.

2. The computer-implemented method of claim 1, further comprising:
   collecting a binocular image from the subject;
   obtaining a three-dimensional representation of the subject by applying the three-dimensional model to the binocular image from the subject; and
   embedding the three-dimensional representation of the subject in a virtual reality environment in real-time.

3. The computer-implemented method of claim 1, wherein forming a texture transformation based on an illumination parameter comprises providing the images from the subject under multiple illumination configurations to a low-resolution multilayered network and to a high-resolution multilayered network; and combining an output from the low-resolution multilayered network with an output of the high-resolution multilayered network.

4. The computer-implemented method of claim 1, wherein forming the three-dimensional mesh comprises identifying a facial expression of the subject in the images, and associating a facial expression factor with the facial expression of the subject.

5. The computer-implemented method of claim 1, wherein forming the three-dimensional mesh comprises identifying a head pose of the subject, the head pose including a rotation of a head of the subject and a translation of the head of the subject.

6. The computer-implemented method of claim 1, wherein forming the texture transformation comprises using a bias matrix and a gain matrix including the facial expression factor code, the head pose, and the illumination parameter.

7. The computer-implemented method of claim 1, wherein forming the texture transformation comprises determining an illumination parameter based on an illumination configuration for the images from the subject.

8. The computer-implemented method of claim 1, wherein determining a loss factor comprises projecting a three-dimensional representation of the subject onto a two-dimensional image and comparing a selected point in the two-dimensional image with a corresponding point in the test image.

9. The computer-implemented method of claim 1, wherein updating the three-dimensional model comprises evaluating the loss factor for an incremental change to the head pose over an incremental period of time.

10. The computer-implemented method of claim 1, wherein updating the three-dimensional model according to the loss factor comprises embedding a statistical value for the illumination parameter in the texture transformation, the statistical value derived from a multilayered network comprising the images of the subject under multiple illumination configurations.

11. A system, comprising:
a memory storing multiple instructions; and
one or more processors configured to execute the instructions to cause the system to:
collect multiple images of a subject, the images from the subject comprising one or more simultaneous views from different profiles of the subject;
form a three-dimensional mesh for the subject based on a facial expression code and a head pose of the subject extracted from the images of the subject;
form a texture transformation based on an illumination parameter associated with an illumination configuration for the images from the subject;
form a three-dimensional model for the subject based on the three-dimensional mesh and the texture transformation;
determine a loss factor based on selected points in a test image from the subject and a rendition of the test image by the three-dimensional model; and
update the three-dimensional model according to the loss factor, wherein to collect multiple images of the subject the one or more processors execute instructions to select the illumination configuration based on a position, an intensity, and a color gamut for each of multiple light sources around the subject.

12. The system of claim 11, further comprising an array of video cameras configured to collect the multiple images of the subject, including one or more simultaneous views from different profiles of the subject.

13. The system of claim 11, further comprising an array of illumination sources to adjust the illumination configuration for the images from the subject.

14. The system of claim 11, wherein the one or more processors further execute instructions to synchronize the images of the subject collected from two or more different cameras and to form a stereoscopic view of a facial expression of the subject.

15. The system of claim 11, further comprising a binocular camera configured to collect a binocular image from the subject, and wherein the one or more processors execute further instructions to:
obtain a three-dimensional representation of the subject by applying the three-dimensional model to the binocular image from the subject, and
embed the three-dimensional representation of the subject in a virtual reality environment in real-time.

16. The system of claim 11, wherein to update the three-dimensional model the one or more processors are configured to evaluate the loss factor for an incremental change to the head pose of the subject over an incremental period of time.

17. The system of claim 11, wherein to determine the illumination parameter the one or more processors are configured to provide the images from the subject under multiple illumination configurations to a low-resolution multilayered network and to a high-resolution multilayered network; and combining an output from the low-resolution multilayered network with an output of the high-resolution multilayered network.

* * * * *